US012565232B2

(12) United States Patent
Faruque et al.

(10) Patent No.: US 12,565,232 B2
(45) Date of Patent: Mar. 3, 2026

(54) SAFELY SCHEDULING OFFLOADING OF COMPUTING TASKS FOR AN AUTONOMOUS VEHICLE

(71) Applicant: University of California, Irvine, Oakland, CA (US)

(72) Inventors: Mohammad Abdullah Al Faruque, Irvine, CA (US); Yasser Shoukry Ahmed Sakr, Irvine, CA (US); Mohanad Mohamed Abdelmagid Abdelkhale Odema, Irvine, CA (US); James Robert Ferlez, Irvine, CA (US)

(73) Assignee: The Regents of the University of California, Oakland, CA (US)

( * ) Notice: Subject to any disclaimer, the term of this patent is extended or adjusted under 35 U.S.C. 154(b) by 141 days.

(21) Appl. No.: 18/650,842

(22) Filed: Apr. 30, 2024

(65) Prior Publication Data

US 2024/0367678 A1      Nov. 7, 2024

Related U.S. Application Data

(60) Provisional application No. 63/500,243, filed on May 4, 2023.

(51) Int. Cl.
B60W 60/00 (2020.01)

(52) U.S. Cl.
CPC ..... B60W 60/001 (2020.02); B60W 2420/403 (2013.01); B60W 2420/408 (2024.01); B60W 2420/54 (2013.01); B60W 2756/10 (2020.02)

(58) Field of Classification Search
CPC ......... B60W 60/001; B60W 2420/403; B60W 2420/408; B60W 2420/54; B60W 2756/10
See application file for complete search history.

(56) References Cited

U.S. PATENT DOCUMENTS

| | | | |
|---|---|---|---|
| 7,274,950 B2 * | 9/2007 | Castrogiovanni | ..... H04W 12/04 455/418 |
| 7,631,182 B1 * | 12/2009 | Droux | ..... H04L 63/06 713/151 |

(Continued)

OTHER PUBLICATIONS

Andriluka, M., Pishchulin, L., Gehler, P., Schiele, B.: 2d human pose estimation: New benchmark and state of the art analysis. In: IEEE Conference on Computer Vision and Pattern Recognition (CVPR) (Jun. 2014) 8 pages.

(Continued)

*Primary Examiner* — Redhwan K Mawari
(74) *Attorney, Agent, or Firm* — FP; Sikander M. Khan

(57) ABSTRACT

A local computing device of a vehicle receives a stream of sensor data from one or sensors of the vehicle. If a remote computing device is estimated to process the stream of sensor data and provide driving instructions within a maximum acceptable wait time, then the local computing device sends a request to the remote computing device to process the stream of sensor data and provide driving instructions. If the processing is estimated to meet or exceed the maximum acceptable wait time, then the local computing device uses a locally executed neural network to determine driving instructions. The driving instructions received either from the remote computing or from the local neural network are sent to an autonomous driving system of the vehicle. Offloading processing the sensor data to the remote computing device may result in the local computing device consuming less energy.

20 Claims, 18 Drawing Sheets

(56) References Cited

U.S. PATENT DOCUMENTS

| | | | | |
|---|---|---|---|---|
| 9,327,734 | B2 * | 5/2016 | Lombrozo | G01C 21/30 |
| 9,614,917 | B1 * | 4/2017 | Hamilton | H04L 12/2856 |
| 10,181,328 | B2 * | 1/2019 | Jensen | H04R 25/407 |
| 12,013,695 | B1 * | 6/2024 | Fields | G05D 1/0088 |
| 2005/0163482 | A1 * | 7/2005 | Noda | H04N 9/8042 |
| 2006/0265469 | A1 * | 11/2006 | Estrade | H04L 67/08 |
| | | | | 709/217 |
| 2015/0127189 | A1 * | 5/2015 | Mehr | G05D 1/0295 |
| | | | | 701/1 |
| 2016/0179463 | A1 * | 6/2016 | Higa | H04N 21/42213 |
| | | | | 725/52 |
| 2018/0022350 | A1 * | 1/2018 | McNew | B60W 30/182 |
| | | | | 701/23 |
| 2018/0129204 | A1 * | 5/2018 | Ricci | G01C 21/26 |
| 2020/0090521 | A1 * | 3/2020 | Kim | H04W 4/46 |
| 2020/0241526 | A1 * | 7/2020 | Kim | G05D 1/0027 |
| 2021/0278840 | A1 * | 9/2021 | Jaegal | G05D 1/0242 |
| 2022/0103536 | A1 * | 3/2022 | Kida | H04L 63/0485 |
| 2024/0338021 | A1 * | 10/2024 | Fields | G05D 1/0088 |
| 2024/0367678 | A1 * | 11/2024 | Faruque | B60W 60/001 |

OTHER PUBLICATIONS

Ang, M., Chen, X., Liu, W., Qian, C., Lin, L., Ma, L.: Drpose3d: Depth ranking in 3d human pose estimation. arXiv preprint arXiv:1805.08973 (2018) 7 pages.

Barber, C.B., Dobkin, D.P., Huhdanpaa, H.: The Quickhull algorithm for Convex Hulls. ACM Trans. Math. Softw. 22(4), 469-483 (Dec. 1996) 15 pages.

Cai, Y., Ge, L., Liu, J., Cai, J., Cham, T.J., Yuan, J., Thalmann, N.M.: Exploiting spatial-temporal relationships for 3d pose estimation via graph convolutional networks. In: 2019 IEEE/CVF International Conference on Computer Vision (ICCV). pp. 2272-2281 (2019) 10 pages.

Chen, C.H., Ramanan, D.: 3d human pose estimation = 2d pose estimation matching. In: Proceedings of the IEEE conference on computer vision and pattern recognition. pp. 7035-7043 (2017) 9 pages.

Chen, Tyagi, A., Agrawal, A., Drover, D., Mv, R., Stojanov, S. Unsupervised 3d pose estimation with geometric self-supervision. In: Proceedings of the IEEE/CVF Conference on Computer Vision and Pattern Recognition. pp. 5714-5724 (2019).

Cheng, Y., Yang, B., Wang, B., Yan, W., Tan, R.T.: Occlusion-aware networks for 3d human pose estimation in video. In: Proceedings of the IEEE/CVF International Conference on Computer Vision (ICCV) (Oct. 2019) 10 pages.

Ci, H., Wang, C., Ma, X., Wang, Y.: Optimizing network structure for 3d human pose estimation. In: Proceedings of the IEEE/CVF international conference on computer vision. pp. 2262-2271 (2019) 10 pages.

Ghezelghieh, M.F., Kasturi, R., Sarkar, S.: Learning camera viewpoint using cnn to improve 3d body pose estimation. In: 2016 Fourth International Conference on 3D Vision (3DV). pp. 685-693 (2016) 9 pages.

Goel, S., Pavlakos, G., Rajasegaran, J., Kanazawa, A., Malik, J.: Humans in 4d: Reconstructing and tracking humans with transformers. In: Proceedings of the IEEE/CVF International Conference on Computer Vision (ICCV). pp. 14783-14794 (Oct. 2023) 18 pages.

Gong, K., Zhang, J., Feng, J.: Poseaug: A differentiable pose augmentation framework for 3d human pose estimation. In: Proceedings of the IEEE/CVF Conference on Computer Vision and Pattern Recognition. pp. 8575-8584 (2021).

Habibie, I., Xu, W., Mehta, D., Pons-Moll, G., Theobalt, C.: In the wild human pose estimation using explicit 2d features and intermediate 3d representations. In:Proceedings of the IEEE/CVF conference on computer vision and pattern recognition. pp. 10905-10914 (2019).

Ionescu, C., Papava, D., Olaru, V., Sminchisescu, C.: Human3.6m: Large scale datasets and predictive methods for 3d human sensing in natural environments. IEEE Transactions on Pattern Analysis and Machine Intelligence 36(7), 1325-1339 (2014) 15 pages.

Kingma, D.P., Ba, J.: Adam: A method for stochastic optimization. arXiv preprint arXiv:1412.6980 (2014) 15 pages.

Kundu, J.N., Seth, S., Jampani, V., Rakesh, M., Babu, R.V., Chakraborty, A.: Self-supervised 3d human pose estimation via part guided novel image synthesis. In: Proceedings of the IEEE/CVF Conference on Computer Vision and Pattern Recognition. pp. 6152-6162 (2020) 11 pages.

Li, C., Lee, G.H.: Generating multiple hypotheses for 3d human pose estimation with mixture density network. In: Proceedings of the IEEE/CVF conference on computer vision and pattern recognition. pp. 9887-9895 (2019) 9 pages.

Li, S., Chan, A.B.: 3d human pose estimation from monocular images with deep convolutional neural network. In: Asian Conference on Computer Vision. pp. 332-347. Springer (2014) 16 pages.

Li, S., Zhang, W., Chan, A.B.: Maximum-margin structured learning with deep networks for 3d human pose estimation. In: Proceedings of the IEEE international conference on computer vision. pp. 2848-2856 (2015) 9 pages.

Lin, T.Y., Maire, M., Belongie, S., Hays, J., Perona, P., Ramanan, D., Dollár, P., Zitnick, C.L.: Microsoft coco: Common objects in context. In: Computer Vision—ECCV 2014: 13th European Conference, Zurich, Switzerland, Sep. 6-12, 2014, Proceedings, Part V 13. pp. 740-755. Springer (2014) 15 pages.

Liu, K., Ding, R., Zou, Z., Wang, L., Tang, W.: A comprehensive study of weight sharing in graph networks for 3d human pose estimation. In: European Conference on Computer Vision. pp. 318-334. Springer (2020) 17 pages.

Loshchilov, I., Hutter, F.: Sgdr: Stochastic gradient descent with warm restarts. arXiv preprint arXiv:1608.03983 (2016) 16 pages.

Martinez, J., Hossain, R., Romero, J., Little, J.J.: A simple yet effective baseline for 3d human pose estimation. In: Proceedings of the IEEE international conference on computer vision. pp. 2640-2649 (2017) 10 pages.

Mehta, D., Sridhar, S., Sotnychenko, O., Rhodin, H., Shafiei, M., Seidel, H.P., Xu, W., Casas, D., Theobalt, C.: Vnect: Real-time 3d human pose estimation with a single rgb camera. Acm transactions on graphics (tog) 36(4), 1-14 (2017) 13 pages.

Moreno-Noguer, F.: 3d human pose estimation from a single image via distance matrix regression. In: Proceedings of the IEEE conference on computer vision and pattern recognition. pp. 2823-2832 (2017) 10 pages.

Pavlakos, G., Zhou, X., Daniilidis, K.: Ordinal depth supervision for 3d human pose estimation. In: Proceedings of the IEEE Conference on Computer Vision and Pattern Recognition. pp. 7307-7316 (2018) 10 pages.

Pavlakos, G., Zhou, X., Derpanis, K.G., Daniilidis, K.: Coarse-to-fine volumetric prediction for single-image 3d human pose. In: Proceedings of the IEEE conference on computer vision and pattern recognition. pp. 7025-7034 (2017) 10 pages.

Pavllo, D., Feichtenhofer, C., Grangier, D., Auli, M.: 3D human pose estimation in video with temporal convolutions and semi-supervised training. In: Proceedings of the IEEE/CVF Conference on Computer Vision and Pattern Recognition (CVPR) (Jun. 2019) 10 pages.

Sharma, S., Varigonda, P.T., Bindal, P., Sharma, A., Jain, A.: Monocular 3D human pose estimation by generation and ordinal ranking. In: Proceedings of the IEEE/CVF international conference on computer vision. pp. 2325-2334 (2019) 10 pages.

Sun, K., Xiao, B., Liu, D., Wang, J.: Deep high-resolution representation learning for human pose estimation. In: CVPR (2019) 12 pages.

Sun, X., Shang, J., Liang, S., Wei, Y.: Compositional human pose regression. In: Proceedings of the IEEE International Conference on Computer Vision. pp. 2602-2611 (2017) 10 pages.

Tekin, B., Katircioglu, I., Salzmann, M., Lepetit, V., Fua, P.: Structured prediction of 3d human pose with deep neural networks. arXiv preprint arXiv:1605.05180 (2016) 11 pages.

Varol, G., Romero, J., Martin, X., Mahmood, N., Black, M.J., Laptev, I., Schmid, C.: Learning from synthetic humans. In: CVPR (2017) 9 pages.

(56) References Cited

OTHER PUBLICATIONS

Von Marcard, T., Henschel, R., Black, M., Rosenhahn, B., Pons-Moll, G.: Recovering accurate 3d human pose in the wild using IMUs and a moving camera. In: European Conference on Computer Vision (ECCV) (Sep. 2018) 17 pages.

Wandt, B., Little, J.J., Rhodin, H.: Elepose: Unsupervised 3d human pose estimation by predicting camera elevation and learning normalizing flows on 2d poses. In: Proceedings of the IEEE/CVF Conference on Computer Vision and Pattern Recognition (CVPR). pp. 6635-6645 (Jun. 2022) 11 pages.

Wandt, B., Rosenhahn, B.: Repnet: Weakly supervised training of an adversarial reprojection network for 3d human pose estimation. In: Proceedings of the IEEE/CVF Conference on Computer Vision and Pattern Recognition. pp. 7782-7791 (2019) 10 pages.

Wang, Z., Chen, L., Rathore, S., Shin, D., Fowlkes, C.: Geometric pose affordance: 3d human pose with scene constraints. In: Arxiv (2019) 21 pages.

Wang, Z., Shin, D., Fowlkes, C.C.: Predicting camera viewpoint improves cross-dataset generalization for 3d human pose estimation. In: European Conference on Computer Vision. pp. 523-540. Springer (2020) 29 pages.

Yang, W., Ouyang, W., Wang, X., Ren, J., Li, H., Wang, X.: 3d human pose estimation in the wild by adversarial learning. In: Proceedings of the IEEE conference on computer vision and pattern recognition. pp. 5255-5264 (2018) 10 pages.

Zeng, A., Sun, X., Huang, F., Liu, M., Xu, Q., Lin, S.: Srnet: Improving generalization in 3d human pose estimation with a split-and-recombine approach. In: European Conference on Computer Vision. pp. 507-523. Springer (2020) 25 pages.

Zhai, K., Nie, Q., Ouyang, B., Li, X., Yang, S.: Hopfir: Hop-wise graphformer with intragroup joint refinement for 3d human pose estimation. In: Proceedings of the IEEE/CVF International Conference on Computer Vision (ICCV). pp. 14985-14995 (Oct. 2023).

Zhang, Wong, Geng, Unsupervised Domain Adaptation for 3D Human Pose Estimation, In: Proceedings of the 27th ACM International Conference on Multimedia. p. 926-934. MM '19, Association for Computing Machinery, New York, NY, USA (2019), 9 pages.

Zhao, L., Peng, X., Tian, Y., Kapadia, M., Metaxas, D.N.: Semantic graph convolutional networks for 3d human pose regression. In: Proceedings of the IEEE/CVF conference on computer vision and pattern recognition. pp. 3425-3435 (2019) 13 pages.

Zhou, K., Han, X., Jiang, N., Jia, K., Lu, J.: Hemlets pose: Learning part-centric heatmap triplets for accurate 3d human pose estimation. In: Proceedings of the IEEE/CVF international conference on computer vision. pp. 2344-2353 (2019) 10 pages.

Zhou, X., Sun, X., Zhang, W., Liang, S., Wei, Y.: Deep kinematic pose regression. In: European Conference on Computer Vision. pp. 186-201. Springer (2016) 145, 16 pages.

Zimmermann, C., Brox, T.: Learning to estimate 3d hand pose from single rgb images. In: Proceedings of the IEEE International Conference on Computer Vision (ICCV) (Oct. 2017) 9 pages.

Zou, Z., Tang, W.: Modulated graph convolutional network for 3d human pose estimation. In: Proceedings of the IEEE/CVF International Conference on Computer Vision. pp. 11477-11487 (2021) 11 pages.

* cited by examiner

Input: Controller: $\pi$, Safety filter: $\Psi$, Lookup Table: $T$, Base Period: $\tau$, Optimization Subset: $\Lambda'$, State Estimation Subset: $\Lambda''$

```
1   Initialize: n=0, Δ_max=0, Θ'={}, new_Δ=True
2   while True do
            // state estimation and safe control
3           x, Θ'' ← N_i(y_i, x, u)∀N_i ∈ Λ''   // state estimation
4           Θ ← aggregate(Θ', Θ'')
5           u ← π(Θ)                              // main control
6           u' ← Ψ(x, u)                          // safe control
            // sample new safety deadline
7           if new_Δ == True then
8               Δ_max ← T(x, u)                   // probe lookup table
9               δ_max = ⌊Δ_max/τ⌋
10              n = 0, new_Δ = False              // new interval
11              done_i == False ∀N_i ∈ Λ'         // reset done flags
            // optimized safe processing
12          Θ'={}
13          for N_i ∈ Λ' do
14              if δ_i ≥ δ_max or n == (δ_max − δ_i) then
15                  Ñ_i(n) = N_i(n)              // invoke processing
16                  θ_i ← Ñ_i(n)(y_i)
17                  Θ' ∪ {θ_i}                    // update aggregates
18                  if n == (δ_max − δ_i) then
19                      done_i = True
20              else
21                  Ñ_i(n) = Ω_n                  // invoke optimization
22          if done_i == True ∀N_i ∈ Λ' then
                // safe interval ended for all
23              new_Δ=True
24          n = n + 1
```

FIG. 5

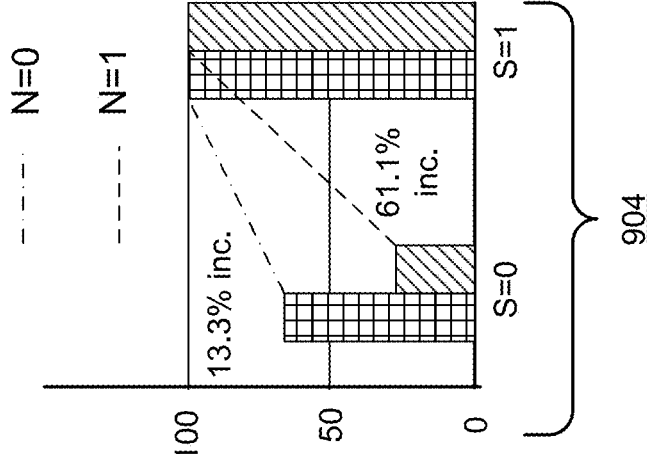
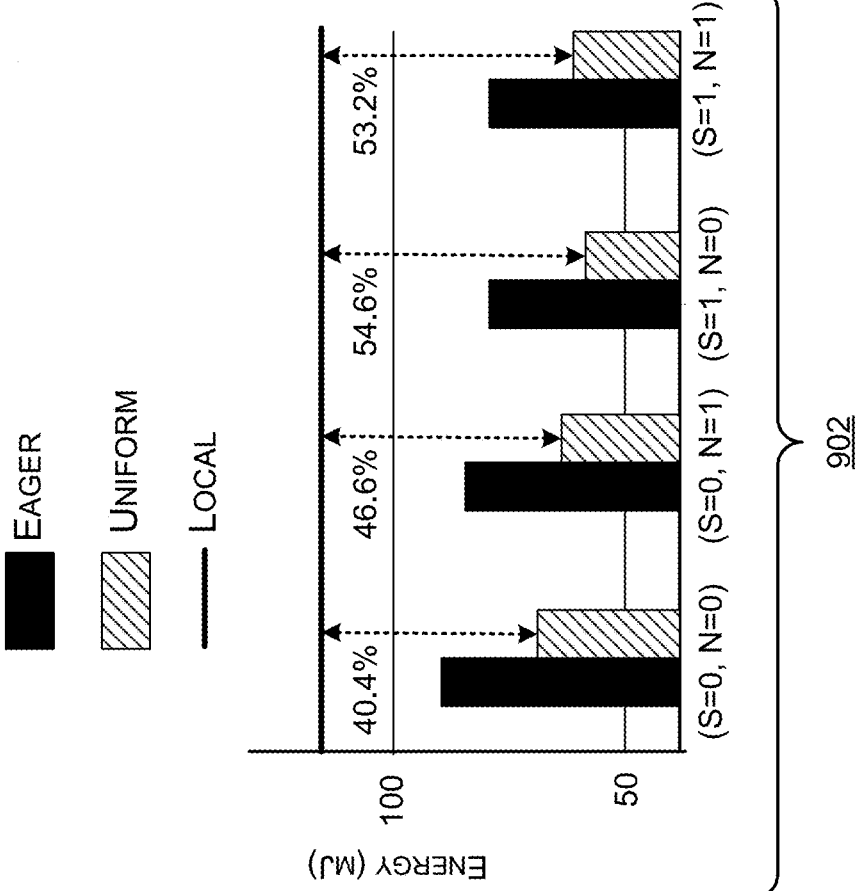
FIG. 9

| Policy | (S, N) | Controller 1 | | | Controller 2 | | | Controller 3 | | | Controller 4 | | |
|---|---|---|---|---|---|---|---|---|---|---|---|---|---|
| | | CD(m) | TCR(%) | E(mJ) | CD (m) | TCR(%) | E(mJ) | CD(m) | TCR(%) | E(mJ) | CD(m) | TCR(%) | E(mJ) |
| Local | (0, 0) | 0.92 | 65.7 | | 2.3 | 100 | | 5.5 | | | 5.8 | | |
| | (0, 1) | 0.8 | 22.9 | 113.5 | 2.3 | 97.1 | 113.5 | 5.5 | 100 | 113.5 | 5.8 | 100 | 113.5 |
| | (1, 0) | 2.87 | 100 | | 3.5 | 100 | | 5.5 | | | 5.9 | | |
| | (1, 1) | 2.91 | 100 | | 3.6 | 100 | | 5.4 | | | 5.7 | | |
| EnergyShield (eager) | (0, 0) | 0.8 | 68.6 | 90.8 | 2.3 | 100 | 90 | 5.5 | 100 | 79.7 | 5.8 | 100 | 77.6 |
| | (0, 1) | 0.8 | 34.3 | 90 | 2.3 | 100 | 89 | | | 80 | 5.7 | | 78.9 |
| | (1, 0) | 2.8 | 100 | 85.8 | 3.5 | 100 | 81.6 | | | 79.6 | 5.7 | | 77.5 |
| | (1, 1) | 2.8 | 100 | 85.9 | 3.6 | 100 | 81.9 | | | 78.5 | 5.8 | | 77.9 |
| EnergyShield (uniform) | (0, 0) | 0.9 | 74.3 | 67.7 | 2.3 | 100 | 63.5 | 5.5 | 100 | 43.7 | 5.8 | 100 | 39.7 |
| | (0, 1) | 0.7 | 22.9 | 60.6 | 2.3 | 97.1 | 63.1 | 5.5 | | 44.4 | 5.7 | | 40.8 |
| | (1, 0) | 2.9 | 100 | 51.5 | 3.5 | 100 | 44.5 | 5.5 | | 43.6 | 5.8 | | 40.1 |
| | (1, 1) | 2.8 | 100 | 53.1 | 3.6 | 100 | 45.7 | 5.4 | | 42.1 | 5.7 | | 39.8 |

FIG. 15

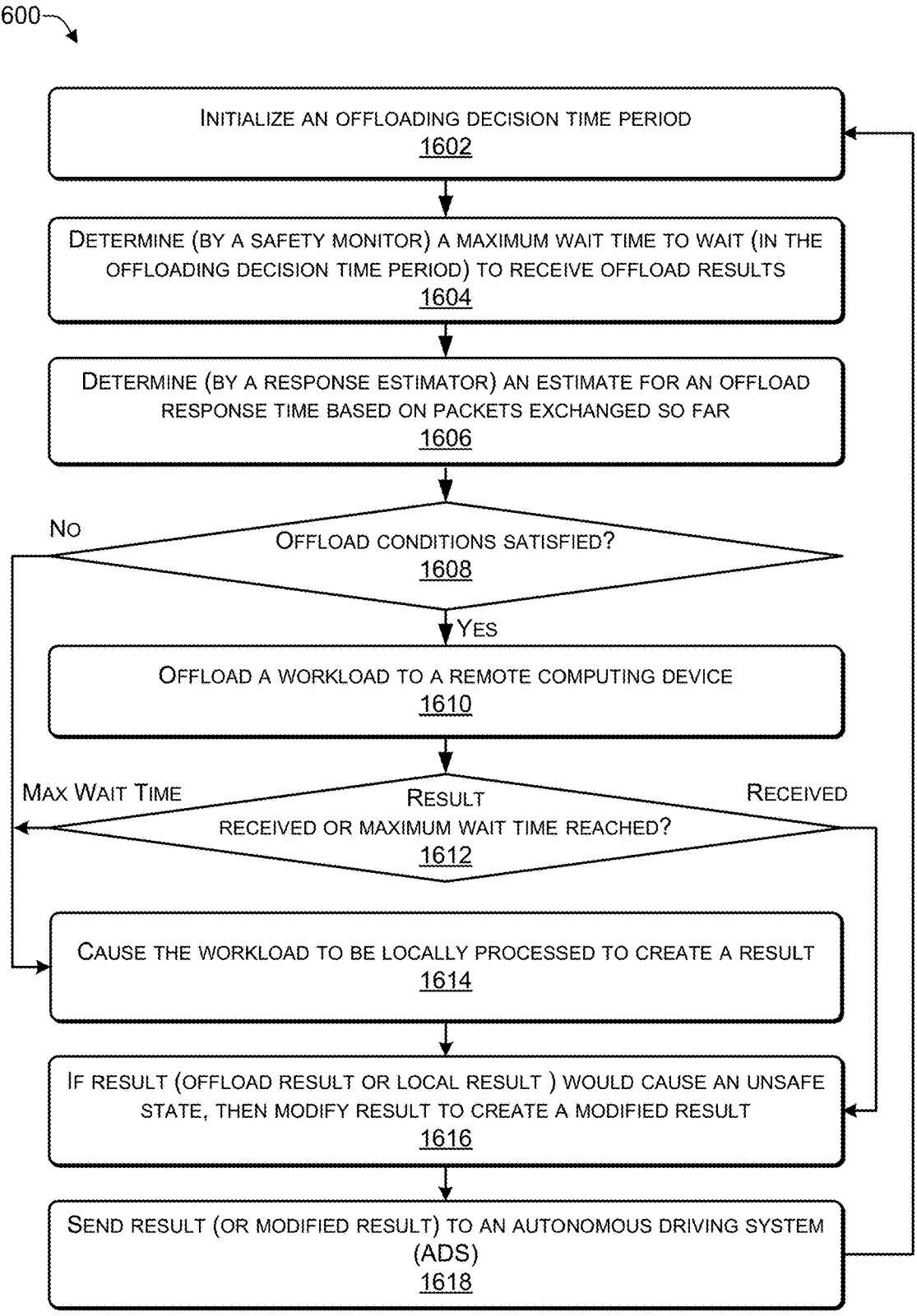

1600

INITIALIZE AN OFFLOADING DECISION TIME PERIOD
1602

DETERMINE (BY A SAFETY MONITOR) A MAXIMUM WAIT TIME TO WAIT (IN THE OFFLOADING DECISION TIME PERIOD) TO RECEIVE OFFLOAD RESULTS
1604

DETERMINE (BY A RESPONSE ESTIMATOR) AN ESTIMATE FOR AN OFFLOAD RESPONSE TIME BASED ON PACKETS EXCHANGED SO FAR
1606

No      OFFLOAD CONDITIONS SATISFIED?
1608

YES

OFFLOAD A WORKLOAD TO A REMOTE COMPUTING DEVICE
1610

MAX WAIT TIME      RESULT      RECEIVED
RECEIVED OR MAXIMUM WAIT TIME REACHED?
1612

CAUSE THE WORKLOAD TO BE LOCALLY PROCESSED TO CREATE A RESULT
1614

IF RESULT (OFFLOAD RESULT OR LOCAL RESULT ) WOULD CAUSE AN UNSAFE STATE, THEN MODIFY RESULT TO CREATE A MODIFIED RESULT
1616

SEND RESULT (OR MODIFIED RESULT) TO AN AUTONOMOUS DRIVING SYSTEM (ADS)
1618

FIG. 16

SAFELY SCHEDULING OFFLOADING OF COMPUTING TASKS FOR AN AUTONOMOUS VEHICLE

CROSS-REFERENCE TO RELATED APPLICATIONS

The present non-provisional patent application claims priority from U.S. Provisional Application 63/500,243 filed on May 4, 2023, which is incorporated herein by reference in its entirety and for all purposes as if completely and fully set forth herein.

STATEMENT REGARDING FEDERALLY SPONSORED RESEARCH OR DEVELOPMENT

This invention was made with government support under Grant Numbers CCF-2140154, CNS-2002405, and ECCS-2139781 awarded by the National Science Foundation. The government has certain rights in the invention.

BACKGROUND OF THE INVENTION

Field of the Invention

The present invention is directed to a mechanism to perform safety-aware, state-contextual, offloading of Autonomous Driving Systems (ADS) controllers, from a Deep Neural Network (DNN) to an edge, using a controller shield that provides safety by providing a low-power run-time safety monitor to enforce safety measures.

Description of the Related Art

Advances in the application of Neural Networks (NNs), particularly Deep NNs (DNNs), have spurred revolutionary progress on a number of artificial intelligence (AI) tasks, such as perception, motion planning, and control, enabling their potential use in Autonomous Driving Systems (ADSs). Unfortunately, state-of-the art ADSs typically use very large DNN architectures to solve essential perception and control tasks, such as, for example, processing the output of multiple cameras, light detection and ranging (LiDAR) sensors, and other types of sensors. As a result, current ADSs are only possible with significant computational resources deployed on the vehicle itself, since their DNNs must process multiple high-bandwidth sensors in real time. In addition, such computational resources (e.g., high-capacity on-vehicle computers) typically require a large amount of energy.

Offloading large amounts of computations to devices with finite computational resources is inherently contradictory because any low-power optimizations for autonomous systems are developed and evaluated in isolation for specific processing modules, without consideration of the broader system perspective and what formal properties the system possesses. Having strict formal guarantees on safety may restrict the application of low-power optimization techniques to enhance the overall system's performance efficiency, mainly due to the uncertainty arising from the application of such optimizations. Because of this, offloading optimizations may be prone to sporadic connectivity failures, making their adoption unlikely in real-world scenarios.

A more complete understanding of the present disclosure may be obtained by reference to the following Detailed Description when taken in conjunction with the accompanying Drawings. In the figures, the left-most digit(s) of a reference number identifies the figure in which the reference number first appears. The same reference numbers in different figures indicate similar or identical items.

FIG. 4 shows a diagram of a multi-sensor autonomous system pipeline, according to some embodiments.

FIG. 5 illustrates an example algorithm (using pseudo-code) of a runtime control loop experienced by an autonomous system with support for safety aware optimizations, according to some embodiments.

FIG. 9 illustrates energy efficiency gains for EnergyShield with respect to continuous local execution and to safety analysis, according to some embodiments.

FIG. 15 illustrates EnergyShield performance across different reinforcement learning (RL) controllers, according to some embodiments.

FIG. 16 illustrates a process that includes offloading a workload to a remote computing device, according to some embodiments.

DETAILED DESCRIPTION

Figure 1:
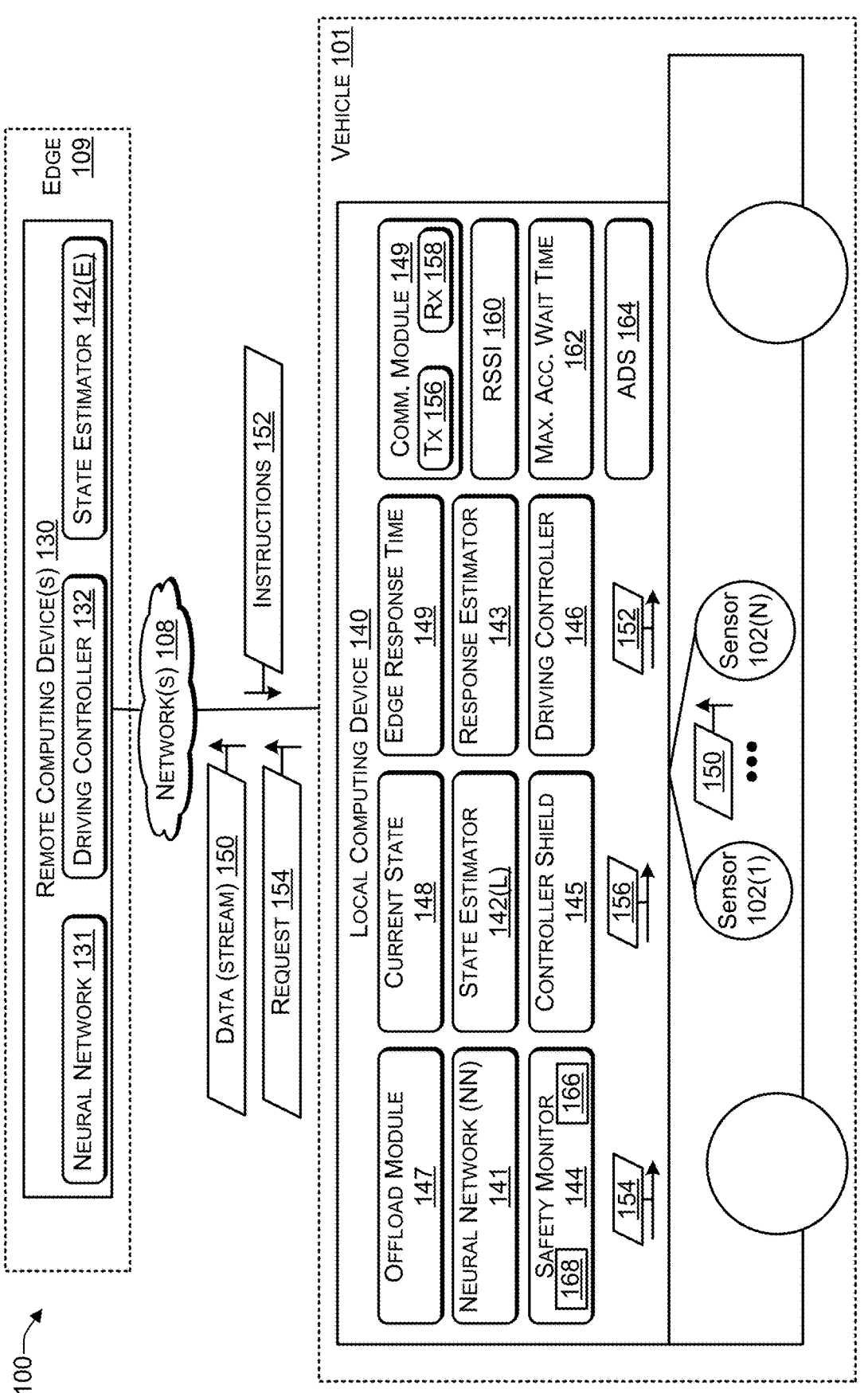
FIG. 1 illustrates a system for safe neural-network (NN)-to-edge offloading of autonomous driving system (ADS) controllers in a vehicle, according to some embodiments.

The systems and techniques described herein enable a vehicle with an autonomous driving system (ADS) to wirelessly offload resource intensive computations to edge computing devices (e.g., remote computing devices, such as remote servers or virtual cloud-based servers) without sacrificing safety. One advantage of performing such offloads is that computing resources on the vehicle may consume less power, resulting in energy savings. Such energy savings may enable a vehicle, such as an electric vehicle (EV) to travel further as compared to a vehicle that does not offload resource intensive computations but instead performs the computations using on-vehicle computing resources. Advances in semiconductor design and packaging have made cheap, low-power silicon available and advances in wireless networking have made high-bandwidth, low-latency radio links possible. Together, these advances have led to increasingly ubiquitous, cheap, wirelessly accessible computational resources near the edge of a conventional hard-wired infrastructure. In particular, reliable, millisecond-latency wireless connections between connected autonomous driving systems (ADSs) and nearby edge computing (remote computing devices) is now possible.

The availability of edge computing resources enables reducing the local energy consumption on vehicles with autonomous driving system (ADS) by wirelessly offloading computational resource intensive computations (e.g., perception and control DNN computations) to nearby edge computing infrastructure (also referred to herein as remote computing devices). While current wireless networks and offloading-friendly DNN architectures (e.g., encoder/decoders) cannot offer guarantees that bringing edge computing "into the loop" results in equivalent (or even acceptable) performance compared to on-vehicle hardware, the systems and techniques described herein provide safety guarantees to take into account the possibility of relatively short delays when obtaining a control action or perception classification and thereby avoid potentially fatal consequences when humans are in the vehicle.

For mission-critical neural network (NN) controllers in autonomous systems (e.g., self-driving cars), low-power optimizations, such as task offloading, are secondary to robustness and safety. For example, such systems operate and interact in ever-evolving dynamic environments, where they maintain guarantees regarding safety, robustness, and performance. These guarantees may be maintained by large, high-complexity neural network controllers whose computational capacity enables them to possess specific formal properties to provide safe control actions. Such mission-critical systems usually operate on embedded devices characterized by finite computational resources and limited computing capabilities, making them amenable for low-power optimizations.

A number of approaches may be used to provide data-trained controllers with formal guarantees in regards to safety, such as by augmenting the trained controllers. Examples of this include the use of Lyapunov methods, safe model predictive control, reachability analysis, barrier certificates, and online learning of uncertainties. A barrier certificate may be used to prove that a particular region is forward invariant for a particular ordinary differential equation or hybrid dynamical system. In this way, a barrier function can be used to show that if a solution starts in a given set, then it cannot leave that set. Showing that a set is forward invariant is an aspect of safety, which is the property where a system is guaranteed to avoid obstacles specified as an unsafe set. Barrier certificates are analogous for safety as Lyapunov functions are for stability. For every ordinary differential equation that robustly fulfills a safety property of a certain type, there is a corresponding barrier certificate. Controller shielding is another approach that may fall in the barrier function category. Another approach may verify the formal safety properties of learned controllers using formal verification techniques (e.g., model checking), such as by using satisfiability modulo theories (SMT) like solvers or hybrid-system verification. SMT is the problem of determining whether a mathematical formula is satisfiable.

Unfortunately, these approaches only assess the safety of a particular controller rather than design or train a safe agent. The systems and techniques described here extend the capability of a formal safety component to not only provide safety interventions, but to also act as a runtime safety monitor to determine safe time windows within which offloading can be performed.

To enable energy efficiency for computationally constrained devices, the systems and techniques to offload a workload, such as by adjusting the workload that is offloaded based on network connectivity conditions. For DNNs, the systems and techniques use split computing to divide the network between local devices (e.g., edge devices) and remote devices (e.g., edge server, fog server, cloud server, or other remote server) at a layer that reduces (e.g., minimizes) the overall performance overhead for the local computing resources. An extreme case may include directly offloading raw inputs from a local edge device to an edge server and the local edge device receiving the results directly from the server. To improve performance by offloading, a DNN's structure may be modified to include a pre-offload mechanism to reduce the size of transmissible data, thereby reducing the costs of both computation and communication. The systems and techniques may apply split-computing for end-to-end control in autonomous vehicles. Because wireless links can be fragile, the systems and techniques may include replicating portions of the remote platform on the local edge device such that, in case of delayed responses, the local pipeline can be invoked, which is referred to as fail-safe offloading. It should be noted that the various features described herein can be freely combined with each other, unless specifically otherwise noted.

The systems and techniques described herein provide a shield-based runtime safety monitor ("shield"). The shield provides several significant features. For example, the shield enforces safety features including providing a runtime safety monitor to quantify the time until the system is unsafe. The shield-based runtime safety monitor characterizes two things. First, the evolution of a vehicle's dynamics through time (e.g., given the current speed, orientation, and position, predict where the vehicle will be in the next x seconds, x>0). Second, a safety radius around an obstacle of interest (which is solved using a Zeroing-Barrier Function (ZBF)), enabling the shield to override control and perform safe maneuvering if the vehicle gets too close to the obstacle. The goal of the systems and techniques is to prevent the vehicle from entering an unsafe circle around the obstacle (for the shield to be effective). The unsafe circle around the obstacle is referred to as an unsafe state. Because the systems and techniques are able to determine how the vehicle's position evolves over time, the systems and techniques are able to predict how much time is available before the vehicle touches the circle around the obstacle. The time available before the vehicle touches the circle (e.g., enters the unsafe state) is referred to as time-to-unsafe. Second, the runtime safety monitor takes into consideration implementation complexity and energy consumption. The runtime monitor is used to quantify the safety of an agent (e.g., reinforcement learning (RL) agent). Here, the agent is the vehicle. The systems and techniques use the current value of the safety function evaluation to derive a quantification of the time until the agent (the vehicle) becomes unsafe. The quantification is performed in an energy efficient way, e.g., via a small lookup table that requires low-computational overhead, to obtain a guaranteed time-until-unsafe. For example, the runtime safety monitor may use a particular Zeroing- Barrier Function (ZBF) and shield that are both simple to implement using small, energy efficient, Neural Networks (NNs). Together, these design choices ensure that the energy saved by offloading is less than the shield implementation described herein.

The systems and techniques enable critical computing kernels (e.g., perception/detection workloads) to be offloaded (e.g., transferred) to edge servers while maintaining particular guarantees on safety for the broader vehicular system. In this way, downstream control actions of the vehicle, which are governed by stringent execution latency requirements, are guaranteed when an NN controller's tasks are offloaded, taking into account the uncertainty of wireless communications links. The safety window during which NN controller task offloading is performed (e.g., permitted) is determined based on a state estimation of the vehicular state with respect to existing objects, lane markings, and identifiers within a scene. The state estimation is made possible because of the autonomous vehicle's processing pipeline which includes multiple multi-sensory execution paths.

The systems and techniques implement a runtime safety module that uses the estimated delay time to offload a request for driving instructions to determine whether offloading is safe or not at a particular time. In this way, the systems and techniques provide for energy-efficient generation and processing of autonomous driving instructions without a reduction of safety. The systems and techniques are able to determine how far away the vehicle is from an unsafe state, and can accordingly reduce the computational load on the system. For example, if a time before the vehicle enters into an unsafe state is relatively small (e.g., less than a threshold, such as less than 0.5 seconds), then the systems and techniques may cause the vehicle to run at full computational capacity (rather than less than full computational capacity) for robustness. Otherwise, e.g., if the time before the vehicle enters into an unsafe state is relatively large (e.g., greater than or equal to the threshold, such as 20 seconds), then the systems and techniques can reduce the processing load on the vehicle by offloading it to a nearby roadside server, allowing better management of vehicle resources with relatively low risk.

As a first example, a vehicle includes: (1) a power source, (2) one or more sensors configured to generate a stream of sensor data associated with an environment in which the vehicle is located, (3) an autonomous driving system (ADS) to drive the vehicle autonomously, and (4) a local computing device comprising a memory storage device to store instructions executable by one or more processors to perform various operations. The operations include receiving, by a neural network, the stream of sensor data and outputting, by the neural network, driving instructions that are routed to the autonomous driving system. A response estimator module estimates an edge response time between: (i) sending a request to a remote computing device that is communicatively coupled to the local computing device, and (ii) receiving a response to the request from the remote computing device. The operations include determining, by a state estimator module, a current state of the vehicle and determining, based on the current state of the vehicle, a maximum acceptable wait time for the response to the request. Based on performing a comparison of the maximum acceptable wait time to the edge response time, the operations include determining that a first request can be safely offloaded to the remote computing device and sends the first request from the local computing device to the remote computing device. Sending the first request to the remote computing device for processing results in the local computing device consuming less power from the power source. The operations include receiving, within the maximum acceptable wait time, a first response from the remote computing device. The first response includes first instructions determined based at least in part on a portion of the stream of sensor data. The operations include providing the first instructions to the autonomous driving system. The operations may include determining, based at least in part on the maximum acceptable wait time and on the edge response time, that a second request cannot be safely offloaded to the remote computing device, processing the second request by the local computing device, determining, by the local computing device and based on the second request, a second response comprising second instructions, and providing the second instructions to the autonomous driving system. The operations may include determining, based at least in part on the maximum acceptable wait time and on the edge response time, that a third request can be safely offloaded to the remote computing device, sending the third request from the local computing device to the remote computing device, failing to receive, within the maximum acceptable wait time, a third response from the remote computing device, processing the third request by the local computing device, determining, by the local computing device and based on the third request, the third response that includes third instructions, and providing the third instructions to the autonomous driving system. The one or more sensors comprise: a camera comprising an imaging sensor and a lens, a Light Detection and Ranging (LiDAR) sensor, a Radio Detection And Ranging (RaDAR) sensor, a ultrasound sensor, or any combination thereof. The remote computing device is communicatively coupled to the local computing device by one or more of: a Cellular-vehicle-to-everything (C-V2X) connection, a short-range communication connection, a ZigBee connection, a Wi-Fi connection, a cellular-technology based connection, a Bluetooth connection, a near-field communication (NFC) connection, a low-power wide-area network (LPWAN), an ultra-wideband (UWB) connection, an Institute of Electrical and Electronics Engineers (IEEE) 802.15 connection, or any combination thereof. The current state of the vehicle comprises either: a safe state or an unsafe state. The first instructions are designed to cause the current state of the vehicle to remain in the safe state or transition the current state of the vehicle from the unsafe state to the safe state.

As a second example, a local computing device of a vehicle includes one or more processors and a non-transitory memory device to store instructions executable by the one or more processors to perform various operations. The operations include receiving, by a neural network, a stream of sensor data generated by one or more sensors disposed on the vehicle. The stream of sensor data is associated with an environment in which the vehicle is located. The operations include outputting, by the neural network, driving instructions. The operations include routing the driving instructions to an autonomous driving system that is configured to autonomously drive the vehicle. The operations include estimating, by a response estimator module, an edge response time between: (i) sending a request to a remote computing device that is communicatively coupled to the local computing device and (ii) receiving a response to the request from the remote computing device. The operations include determining, by a state estimator module, a current state of the vehicle. The operations include determining, based on the current state of the vehicle, a maximum acceptable wait time for the response to the request. The operations include performing a comparison of the maximum acceptable wait time to the edge response time. The operations include determining, based at least in part on the maximum acceptable wait time and on the edge response time, that a first request can be safely offloaded to the remote computing device. The operations include sending the first request from the local computing device to the remote computing device. Sending the first request to the remote computing device for processing results in the local computing device consuming less power from the power source. The operations include receiving, within the maximum acceptable wait time, a first response from the remote computing device, the first response comprising first instructions determined based at least in part on a portion of the stream of sensor data. The operations include providing the first instructions to the autonomous driving system. The operations may include determining, based at least in part on the maximum acceptable wait time and on the edge response time, that a second request can be safely offloaded to the remote computing device, sending the second request from the local computing device to the remote computing device, and receiving, within the maximum acceptable wait time, a second response from the remote computing device. The second response includes second instructions. The operations may include determining that the second instructions would cause the current state of the vehicle to transition to an unsafe state, determining, by the local computing device, an alternate set of instructions, and providing the alternate set of instructions, instead of the second instructions, to the autonomous driving controller. The operations may include determining, based at least in part on the maximum acceptable wait time and on the edge response time, that a third request can be safely offloaded to the remote computing device. The operations may include sending the third request from the local computing device to the remote computing device. The operations may include failing to receive, within the maximum acceptable wait time, a third response from the remote computing device. The operations may include processing the third request by the local computing device. The operations may include determining, by the local computing device and based on the third request, that the third response includes third instructions and providing the third instructions to the autonomous driving system. The one or more sensors may include one or more of: a camera comprising an imaging sensor and a lens, a Light Detection and Ranging (LiDAR) sensor, a Radio Detection And Ranging (RaDAR) sensor, a ultrasound sensor, or any combination thereof. The remote computing device is communicatively coupled to the local computing device by one or more of: a Cellular-vehicle-to-everything (C-V2X) connection, a short-range communication connection, a ZigBee connection, a Wi-Fi connection, a cellular-technology based connection, a Bluetooth connection, a near-field communication (NFC) connection, a low-power wide-area network (LPWAN), an ultra-wideband (UWB) connection, an Institute of Electrical and Electronics Engineers (IEEE) 802.15 connection, or any combination thereof. The current state of the vehicle comprises either: a safe state or an unsafe state. The first instructions are determined, by the remote computing device, to cause either (1) the current state of the vehicle to remain in the safe state or (2) the current state of the vehicle to transition from the unsafe state to the safe state.

Any feature or combination of features described herein are included within the scope of the systems and techniques. Additional advantages and aspects of the present invention are apparent in the following detailed description and claims.

FIG. 1 illustrates a system 100 for safe neural-network (NN)-to-edge offloading of autonomous driving system (ADS) controllers 164 in a vehicle, according to some embodiments. The system 100 includes a vehicle 101 having sensors 102(1) to 102(N) (N>0) that is connected to a representative remote computing device 130 via one or more networks 108. While a single representative remote computing device 130 is shown in FIG. 1, it should be understood that the systems and techniques described herein may be configured to use multiple remote computing devices. The remote computing device 130 may also be referred to as an edge device because it is located at an edge 109 of the network 108. The remote computing device 130 includes a remote neural network 131 and a remote driving controller 132. The vehicle 101 includes a local computing device 140 that includes a local neural network 141, a state estimator 142(L) (L=local), an edge response estimator 143, a safety monitor 144, a controller shield 145, and a driving controller 146. The safety monitor 144 may include a safety filter 166 and a safety function 168.

The remote computing device 130 is communicatively coupled to the one or more sensors 102 and one or more processors configured to execute computer-readable instructions, and a memory component. The memory component is used to store a remote neural network 131 that has been trained using previously gathered driving data. The remote neural network 131 is configured to receive a stream of environmental data 150, provided by the sensors 102 via the network 108, as input and generate a set of ADS instructions 152 for the vehicle 101 as output. The remote computing device 130 includes a remote driving controller module 132 (computer-readable instructions) and a state estimator 142 (E) (E=edge). The driving controller 132 receives a request 154 to provide the ADS instructions 152 from the local computing device 140 when a current edge response time is less than a maximum acceptable wait time. The driving controller 132 receives the stream of environmental data 150 from the sensors 102. In response, the remote neural network 131 generates the set of ADS instructions 152 and transmits the set of ADS instructions 152 to the local computing device 140. The instructions 152 are provided to an ADS 164 of the vehicle 101. The ADS 164 is the autonomous driving system that controls the speed and direction of the vehicle 101.

The local computing device 140 is communicatively coupled to the remote computing device 130 and the one or more sensors 102. The local computing device 140 may include a local neural network 141 trained using previously gathered driving data and configured to receive, as input, a stream of environmental data 150 from the one or more sensors 102 and generate driving instructions 152 for the vehicle 101 as output.

The local computing device 140 may include a state estimator module 142 that is configured to receive the stream of environmental data 150 from the one or more sensors (102) and to determine (estimate), based on the stream of environmental data 150, a current state 148 of the vehicle 101.

The local computing device 140 may include an edge response estimator (module) 143 configured to estimate a current edge response time 149 between the remote computing device 130 and the local computing device 140. The local computing device 140 includes a communication module 149 that includes a transmit (Tx) module 156 to transmit signals (e.g., the data (stream) 150 and the request 154) to the remote computing device 130 and a receive (Rx) module 158 to receive signals (e.g., the instructions 152) from the remote computing device 130. The edge response time estimator 143 may implement various estimation techniques to estimate a received signal strength indicator (RSSI) 160 of the communication module 149 at the vehicle. For example, a power associated with the radio signal received by the Rx module 158 may be measured to evaluate the quality of the wireless connection between the local computing device 140 and the remote computing device 130.

The local computing device 140 may include a runtime safety monitor 144 to determine, based on the estimated current state 148 of the vehicle 101, a maximum acceptable wait time 162 to receive a response to the request 154 for ADS instructions from the edge response time (estimator module) 143. The runtime safety monitor 144 may compare the maximum acceptable wait time 162 to the current edge response time 149 to determine if the request 154 for ADS instructions can be safely offloaded. If the runtime safety monitor 144 determines that the request 154 can be safely offloaded (e.g., the current edge response time 149 is less than the maximum acceptable wait time 162), then the runtime safety monitor 144 may accept the request 154 for ADS instructions from the local driving controller 146 and offload the request 154 for ADS instructions to the remote computing device 130. If the runtime safety monitor 144 determines that the request 154 cannot be safely offloaded (e.g., the current edge response time 149 is greater than or equal to the maximum acceptable wait time 162), then the runtime safety monitor 144 transmits the request 154 (to provide ADS instructions) to the local driving controller module 146.

The local computing device 140 may include a controller shield 145 that is configured to receive the set of ADS instructions 152 from the local driving controller module 146 or from the remote computing device 130, receive the estimated current state 148 (produced by the state estimator 142(L) or state estimator 142(E)), and determine whether the set of ADS instructions 152 will lead to a vehicle state 148 that is unsafe. If the controller shield 145 determines that the set of ADS instructions 152 are safe (e.g., lead to a safe vehicle state), then the controller shield 145 transmits the set of ADS instructions 152 to the ADS 164. If the set of ADS instructions are determined to be unsafe (e.g., lead to an unsafe vehicle state), then the controller shield 145 generates an alternate set of ADS instructions 156 and transmits the alternate set of ADS instructions to ADS 164. The local driving controller module 146 takes sensor data 150 from the sensors 102 and generates ADS instructions 152. The controller shield 145 acts as a filter to determine whether the ADS instructions 152 will lead to a safe state for the vehicle 101. If the instructions 152 are predicted to cause the vehicle 101 to remain in a safe state, then the instructions 152 are sent to the ADS 164. Otherwise, if the instructions 152 are predicted to cause the vehicle 101 to transition to an unsafe state, then the controller shield 145 modifies the ADS instructions 152 before they are sent to the ADS 164.

The local computing device 140 may include the local driving controller 146 that generates the request 154 for ADS instructions and transmit the request 154 to the runtime safety monitor 144. If the current edge response time 149 is greater than or equal to the maximum acceptable wait time 162, then the local driving controller 146 accepts the request for ADS instructions 154 from the runtime safety monitor 144. The local driving controller 146 receives the stream of environmental data 150 from the one or more sensors 102 and instructs the local neural network 141 to generate the set of ADS instructions 152, which are executed by the vehicle 101. If the current edge response time 149 is less than the maximum acceptable wait time 162, then the local driving controller 146 accepts the set of ADS instructions 152 from the remote computing device 130 and the vehicle executes the set of ADS instructions 152. In some cases, the local driving controller 146 may transmit the set of ADS instructions 152 to the controller shield 145 before the vehicle 101 executes the ADS instructions 152.

The one or more sensors 102 may, for example, include camera(s), Light Detection and Range (LiDAR) sensors, Radio Detection and Range (RaDAR) sensors, another type of sensor, or any combination thereof. In some cases, the one or more sensors 102 may include ultrasound sensors. In some cases, the sensors 102 may include sensors disposed (e.g., facing) away from the vehicle (e.g., on the road, on traffic lights, on other cars, and the like). An ego vehicle refers to a vehicle that is the focus of a simulation. In some cases, the sensors 102 may include any sensor capable of detecting the state of the ego vehicle 101, including a position, velocity, a relative position, and an orientation of the ego vehicle relative to other objects in the environment, as well as information about the actual or expected state of other objects in the environment, including their current or anticipated positions, velocities, orientations, and the like.

The estimated current state 148 of the vehicle 101 may include a position, an orientation, and a velocity of the ego vehicle in an environment, either in an absolute sense or relative to other objects. The local computing device 140 may be configured to keep the estimated current state 148 in a safe state (e.g., sufficiently far from another object in the environment) and avoid an unsafe state (e.g., heading directly at another object in the environment at a high speed). If the local computing device 140 determines that the current state 148 is in an unsafe state, the local computing device 140 may perform one or more actions to change the current state 148 from the unsafe state to the safe state. For example, the one or more actions may include providing a visual and/or audible warning to the driver of the vehicle 101, causing the vehicle 101 to perform one or more evasive maneuvers (e.g., to avoid a potential collision with another object in the environment), or the like. The evasive maneuvers may include changing the speed of the vehicle 101, changing a direction of the vehicle 101, or another type of evasive maneuver. The local computing device 140 may be communicatively coupled to the remote computing device 130 via the networks 108. The networks 108 may include a Cellular-vehicle-to-everything (C-V2X) connection, a dedicated short-range communication connection (e.g., ZigBee), a Wi-Fi connection (IEEE 802.11), a 5G connection, Bluetooth, NearLink, near-field communication (NFC), Low-power wide-area network (LPWAN), ultra-wideband (UWB), IEEE 802.15, or the like. In some cases, the remote computing device 130 may comprise one or more servers or a cloud-based set of one or more virtual servers.

Figure 2:
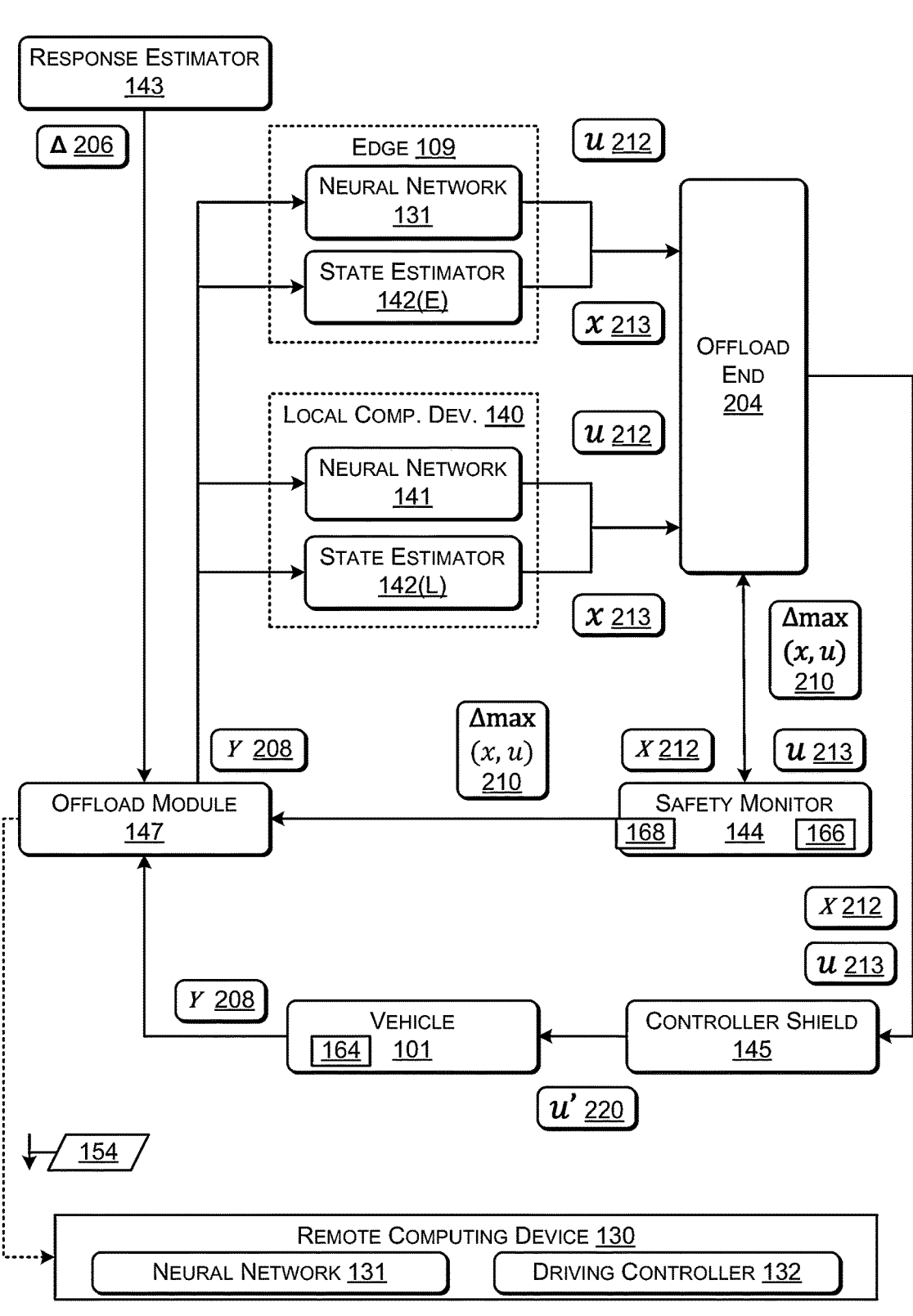
FIG. 2 is a diagram illustrating how various components of FIG. 1 interact with each other, according to some embodiments.

FIG. 2 is diagram 200 illustrating how various components of FIG. 1 interact with each other, according to some embodiments. FIG. 2 illustrates the main components that are located in the local computing device 140 and in the remote computing device 130, and how they integrate with the autonomous driving system (ADS) 164. The ADS 164 can access real-time outputs of the local neural network 141, while incurring significant energy costs (in terms of on-vehicle computational resources). The decision to offload at least a portion of the computations to the remote neural network 131 involves determining whether the computations can be safely offloaded. For example, if the computations are offloaded but a response is not received within a particular period of time (e.g., due to network issues), then the computations are performed locally to avoid any safety issues. In addition, in some cases, the system 200 may correct the control actions (instructions 152 of FIG. 1) provided by the local neural network 141.

The system 200 may limit the amount of time (gate) the local computing device 140 waits after sending each offloading request 154, to enable the actions (instructions 152) provided by the local neural network 141 to be corrected. For example, among all possible offloading delays Δ 206, some may be correctable while others may not be correctable (e.g., Δ=≈ likely cannot be corrected). Whether a particular offloading delay is correctable or not may not be easily determined. Thus, determining whether a particular response delay Δ 206 is correctable determines when to perform offloading (sending the request 154), because the particular response delay indicates an expiration on the safety of the vehicle 101. For example, the local computing device 140 may send the request 154 to offload processing to the remote neural network 131 and wait for a response until Δ 206 samples have elapsed, at which point the local computing device 140 stops waiting for the response and resumes local evaluation using the local neural network 141.

The controller shield 145 maintains the safety of the vehicle 101, regardless of delays, offloading or local execution because the controller shield 145 filters control outputs from whichever (local or remote) neural network they are coming from, and ensures that the vehicle does not transition into an unsafe state. In this way, the controller shield 145 maintains the safety of the vehicle 101 regardless of any delays caused by offloading to the remote computing device 130. If a delay occurs due to offloading to the remote computing device 130, then the controller shield 145 addresses any potentially unsafe behavior of the local neural network 141 based on changes in the current vehicle state 148. The second component is the runtime safety monitor 144 that provides the ADS 164 an upper bound Δmax 210 (in sensor data samples) regarding how long the runtime safety monitor 144 is to wait for a response to a particular offloading request to maintain safety, assuming no updates to the control action (instructions 152) occur while waiting. If the offload delay is Δ 206≤Δmax 210 (e.g., edge response time 149≤maximum acceptable wait time 162), then the controller shield 145 can guarantee safe recovery after holding the last control signal update through the offload delay period. The controller shield 145 may, based on the conditions, use local (on-vehicle) computations from the local neural network 141. The controller shield 145 is a implemented as a low-cost function that is evaluated on the basis of the current state estimates and the last control actions (which may have not necessarily come from the local neural network 141). Thus, Δmax 206 specifies an expiration for the safety guarantee provided by the controller shield 145 when using on-vehicle computations from the local neural network 141. For example, if the output of a camera is sampled at a frequency of 1/30 Hertz (Hz), then the time scale may be computed as a multiple of time windows, where each time window is approximately 33 milliseconds (ms). Of course, time windows shorter than 33 milliseconds may be used. In this way, the time-to-unsafe (Δmax) may be determined as a multiple of samples (time windows).

The controller shield 145 and the runtime safety monitor 144 are designed to work together because their objectives are mutually informed. For example, the controller shield 145 and the runtime safety monitor 144 may both be designed around the same real-valued function over the state space of interest (e.g., Zeroing-Barrier Function (ZBF)). The controller shield 145 and runtime safety monitor 144 may, in some cases, not operate effectively on the same raw sensor measurements used by the driving controller 146 because they may be implemented via ZBFs and controller shields. In particular, both the controller shield 145 and the runtime safety monitor 144 may use some state information (e.g., the current state 148) associated with the autonomous driving system 164 to perform their respective functions. For this reason, the state estimators 142 (and, in some cases, the response estimator 143) may be used to provide state information to the controller shield 145 and the runtime safety monitor 144.

The state estimators 142(E), 142(L) provide the current state 148 estimate as input to controller shield 145 and to runtime safety monitor 144. The state estimators 142(E), 142(L) may be implemented using a neural network (NN) that maps raw inputs y 208 to state estimates x 212 (state 148). One important assumption is that the state estimator 142(L) can compute the state u 213 using the on-vehicle hardware (local computing device 140) in one sample period (e.g., at least 30 Hz). The state estimator 142(L) interfaces with the controller shield 145 and with the runtime safety monitor 144 and both components are state aware and context aware. Thus, the offload module 147 makes context-aware offloading decisions based on the current vehicle state 148 (u 213). Because a prior control action may be held during offload for up to a time Δmax 210, the output of the runtime safety monitor 144 is both control-dependent and state-dependent. For example, the runtime safety monitor 144 produces an output Δmax (x, u) for a state x 212 and control u 213 applied just prior to the offload. The known expiration of safety provided by runtime safety monitor 144, e.g., Δmax (x, u), provides an opportunity to use additional information when the offload module makes an offload decision. In particular, the estimated anticipated edge response time 149, (Δ 206) can be used to forego offloads that are unlikely to complete before the expiration of the safety deadline, Δmax (x, u) 210. In this way, the edge response estimator 143 enables offloads that are predicted to fail to be preemptively skipped.

The response time estimator 143 estimates the current edge response time, Δ 206 which the offload module 147 uses to make offloading decisions. The response time estimator 143 may use any type of estimator, and each type of estimator may lead to some variations in energy consumption. Because Δ 206 is not used to override Δmax (x, u) 210, safety is preserved regardless of the particular estimator used.

The state estimator 142(L) is connected to the controller shield 145 and to the runtime safety monitor 144 via the offload end 204. The output Δmax (x, u) 210 of the runtime safety monitor 144 is provided to the offload module 147. The response estimator 143 determines an estimate of the current edge response time 143 (Δmax (x, u) 210). The offload module 147 determines whether or not to offload processing to the remote computing device 130 based on (1) the maximum acceptable wait time 162 and (2) the current edge response time 143, Δmax (x, u) 210. If the current edge response time 143 is less than the maximum acceptable wait time 162, then the offload module 147 sends the request 154 to offload to the remote computing device 130. If the current edge response time 143 is greater than or equal to the maximum acceptable wait time 162, then the offload module 147 does not send the request 154 and instead uses the local computing device 140.

The runtime safety monitor 144 may include the safety filter 166. The runtime safety monitor 144 may evaluate the safety function 168 that characterizes a set of safe states that the ego system (vehicle 101) can enter based on a (i) current relative positional state and (ii) orientation relative to other objects in the environment. In this way, the safety filter 166 is able to 'correct' incoming control actions (instructions 152) u 213 to create modified instructions u' 220 when the safety monitor 144 determines that the evaluation of the safety function 168 is close (within a safety threshold) of being unsafe, thereby preventing the system 100 from transferring to an unsafe state with respect to other objects in the environment. Moreover, the runtime safety monitor 144 may use the same safety function 168 to estimate Δmax (x, u) 210 based on the current state-action pairs (x, u), thereby enabling the runtime safety monitor 144 to determine a safe time interval for offloading actions to the remote computing device 130.

Figure 3:
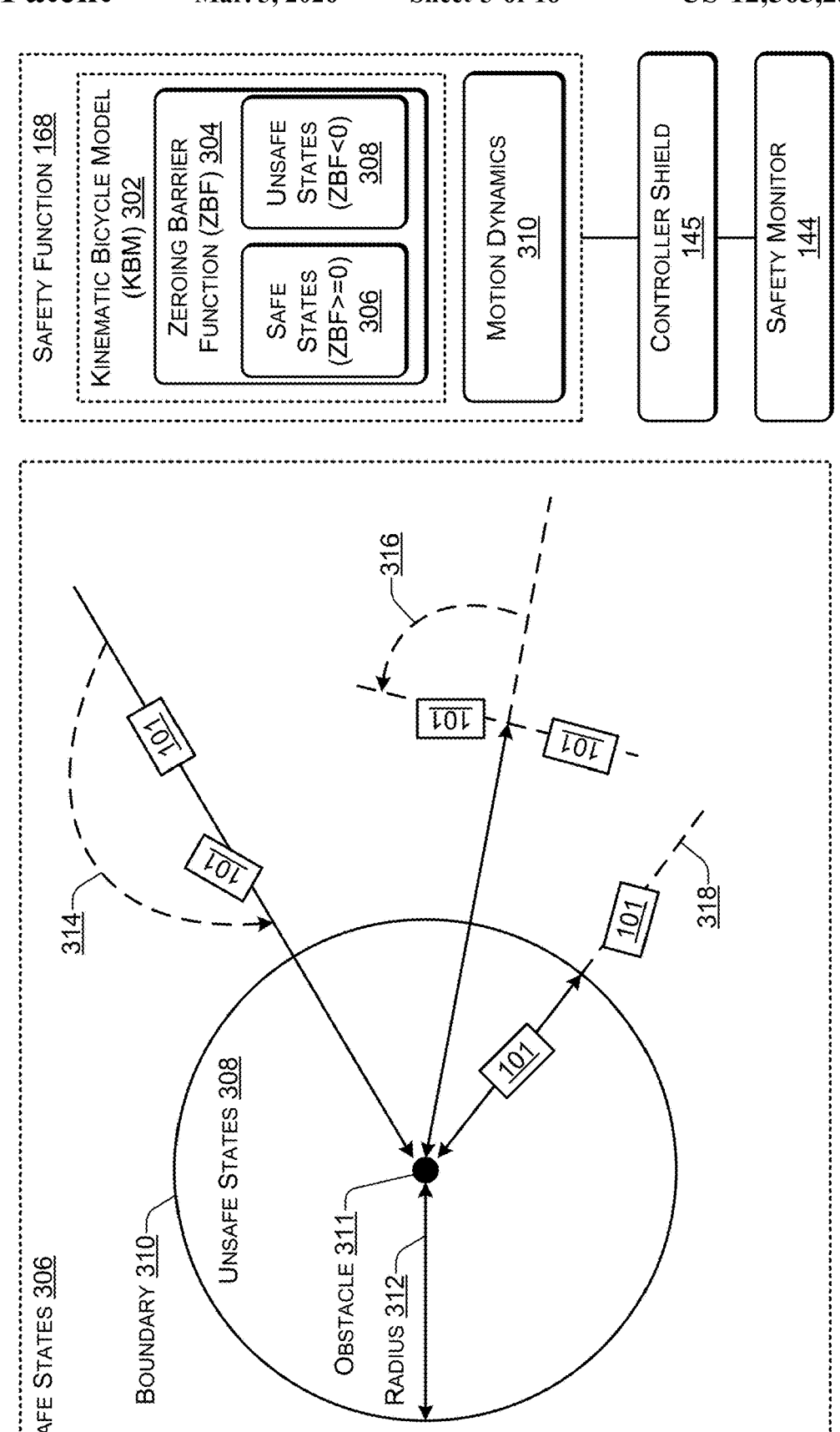
FIG. 3 is a diagram illustrating motion dynamics, according to some embodiments.

FIG. 3 is a diagram illustrating motions dynamics, according to some embodiments. To create the safety function 168, a model of motion dynamics of the system 100 is created to capture the progression in position and orientation incurred by the autonomous driving system 164 of FIG. 1, when operating in real-time. For example, for an autonomous vehicle (e.g., the vehicle 101), a kinematic bicycle model (KBM) 202 may be implemented to model motion dynamics 310 of the vehicle 101. Because the goal is to solve the safety function 168 to provide safety with respect to the closest obstacles in the plane, the KBM model 302 may be implemented with respect to a fixed point in the plane, which can, for example, represent an obstacle 311 (e.g., pedestrian). Using the KBM model 302, the controller shield 145 is created based on the real-valued safety function 168, using a Zeroing Barrier Function (ZBF) 304. The ZBF 304 specifies a set of safe states 306 (ZBF>=0) and a set of unsafe states 308 (ZBF<0) based on the sign (negative or non-negative) of the ZBF 304. Thus, states for which the ZBF 304 is non-negative are considered safe and states for which the ZBF 304 is negative are considered unsafe. The ZBF 304 determines safe controls (as a function of state) in such a way that the sign of the ZBF 304 is invariant along trajectories of the dynamics. The circle in FIG. 3 represents the set of unsafe states 308 surrounding the obstacle 311, as characterized by the ZBF 304. The controller shield 145 is configured to (1) enforce corrective control actions if the vehicle 101 is close to a boundary 310 of the unsafe states 308, thereby preventing the vehicle 101 from entering the unsafe state 308, and (2) characterize the safe time interval Δmax 210 of FIG. 2 based on the relative state with respect to the boundary 310 of the unsafe states 308.

The KBM 302 is used as the formal dynamical model for the autonomous vehicle 101. The KBM 302 is configured to take into account state variables relative to a fixed point in the plane—the obstacle 311 to be avoided—rather than absolute Cartesian coordinates. Thus, the positional states are the distance to a fixed point, $\|r\|$, and orientation angle, $\xi$, of the vehicle with respect to the same. These evolve according to dynamics:

$$\dot{r} \quad v\cos(\xi - \beta) \tag{1}$$

$$\backslash((\xi) = \left(-\frac{1}{r}v\sin(\xi - \beta) - \frac{v}{\ell_r}\sin(\beta)\right); \beta \triangleq \tan^{-1}\left(\frac{\ell_r}{\ell_f + \ell_r}\tan(\delta_f)\right)\backslash)$$

$$\dot{v} \quad a$$

where r t$\triangleq$r and $\xi$ are as described above; v is the vehicle's linear velocity; α is the linear acceleration input;

is δf front-wheel steering angle input1: and $\ell$ f and lr are the distances of the front and rear axles, respectively from the vehicle's center of mass.

Note that at $\xi=\pi/2$ (316), the vehicle is oriented tangentially to the obstacle; and at $\xi=\pi$ (314) or $\xi=0$ (318), the vehicle is pointing directly at or away from the origin, respectively.

Assume that the KBM 302 has a steering constraint, e.g., $[-\delta f_{max}, \delta f_{max}]$. The system 100 may use β directly as a control variable because it is an invertible function of δf. Thus, β is also constrained as $\beta \in [-\beta max, \beta max]$. The state and control vectors for the KBM 302 may be defined as: x $\triangleq (\xi, r, v)$ and $\omega \triangleq (\alpha, \beta)$, with $\omega \in \Omega_{admis}$. $\triangleq R\times[-\beta max, \beta max]$ the set of admissible controls. Thus, the dynamics of the KBM 302 are given by $\chi^\bullet=fKBM (X, \omega)$ with fKBM defined by equation (1) above.

Barrier Functions and Shielding

The controller shield 145 corrects, in real-time, the outputs produced by the driving controller 146 in a closed loop. The objective is to make corrections such that the driving controller 146 (e.g., provided by a manufacturer of the vehicle 101), however it was designed or implemented, becomes safe—hence the "shield" moniker.

Consider a control system x=f x, u in closed loop with a state-feedback controller π: x u. In this scenario, a feedback controller in the closed loop may convert the control system into an autonomous one—the autonomous vector field f, π. A ZBF is defined as follows:

Let x=f x, π x be the aforementioned closed-loop, autonomous system with x t Rn. Also, let h: Rn R, and define $\triangleq$ x Rn: h x 0. If there exists a locally Lipschitz, extended-class-K function, α such that:

$$\nabla xh(x) \cdot f(x, \pi(x)) \geq -\alpha(h(x)) \text{ for all } x \in C \tag{2}$$

then h is said to be a zeroing barrier function (ZBF).

Moreover, the conditions for a barrier function above can be translated into a set membership problem for the outputs of such a feedback controller. For example, let x•=f (x, u) be a control system that is Lipschitz continuous in both of its arguments on a set D×Ω admis.; furthermore, let h: Rn→R with Ch $\triangleq \{x \in Rn|h(x) \geq 0\} \subseteq D$, and let α be a class K function. If the set $$Rh, \alpha(x) \triangleq \{u \in \Omega_{admis} \cdot |\nabla Th(x) \cdot f(x, u) + \alpha(h(x)) \geq 0\} \tag{3}$$

is non-empty for each x E D, and a Lipschitz continuous feedback controller π: x $\mapsto$ →u satisfies $$\pi(x) \in Rh, \alpha(x) \forall x \in D \tag{4}$$

then Ch is forward invariant for the closed-loop dynamics f(•, π(•)).

In particular, if π satisfies (4) and x(t) is a trajectory of x•=f(x,π(x)) with h(x(0))≥0, then h(x(t))≥0 for all t≥0.

Thus, h (and associated a) form a ZBF for the closed-loop, autonomous dynamics f, π. Note also that there is no need to distinguish between a closed-loop feedback controller it, and a composite of it with a function that shields (or filters) its output based on the current state. Hence, the controller shield 145 may be defined as follows:

Let x•=f(x, u), h, 𝔾h, α and D×Ω$_{admis}$. be as in Proposition 1. Then a controller shield is a Lipschitz continuous function 𝔾: D×Ω$_{admis}$→Ω$_{admis}$. such that $$\forall \ (x, u) \in D \times \Omega_{admis} \cdot \textcircled{S}(x, u) \in Rh, \ \alpha(x). \quad (5)$$

A Controller Shield for the KBM

The ZBF 304 and controller shield 145 are designed for the KBM 302 and function in concert to provide controller shielding for the safety property illustrated in FIG. 3, e.g., to prevent the KBM 302 from entering a disk of radius 312 centered at the origin. In particular, the following class of candidate ZBFs for the KBM 302 may be used:

$$\backslash(h_{r,\sigma}(\chi) = h_{r,\sigma}(\xi, r, v) = \frac{\sigma \cos(\xi/2) + 1 - \sigma}{r} - \frac{1}{r}\backslash) \quad (6)$$

$$\alpha_{vmax}(x) = K \cdot v_{max} \cdot x \quad (7)$$

Where α$_{vmax}$ is per se a class K function, and σ∈(0, 1) parameterizes the class. Note also that this class of ZBFs ignores the state variable, v; it is a result that this class is useful as a barrier function provided the vehicle velocity remains (is controlled) within the range 0, v$_{max}$. Note also that the equation has hr⁻,σ X=0 has a convenient solution, which we denote by rmin for future reference:

$$rmin(\xi) = r^{-}/(\sigma \cos(\xi/2) + 1 - \sigma). \quad (8)$$

The system uses a mechanism for choosing the parameter a as a function of KBM parameters (e.g. lr) and safety parameter, r⁻ so that the resulting specific function is a ZBF. In some cases, an extremely lightweight implementation of the barrier may be deployed using a "Shield Synthesizer" that implements a controller shield by approximating a simple single-input/single-output concave function with a Rectified Linear Unit (ReLU) neural network. 𝔾KBM denotes the resulting controller shield, with associated barrier, KBM, and safety parameters inferred from the context.

Figure 4:
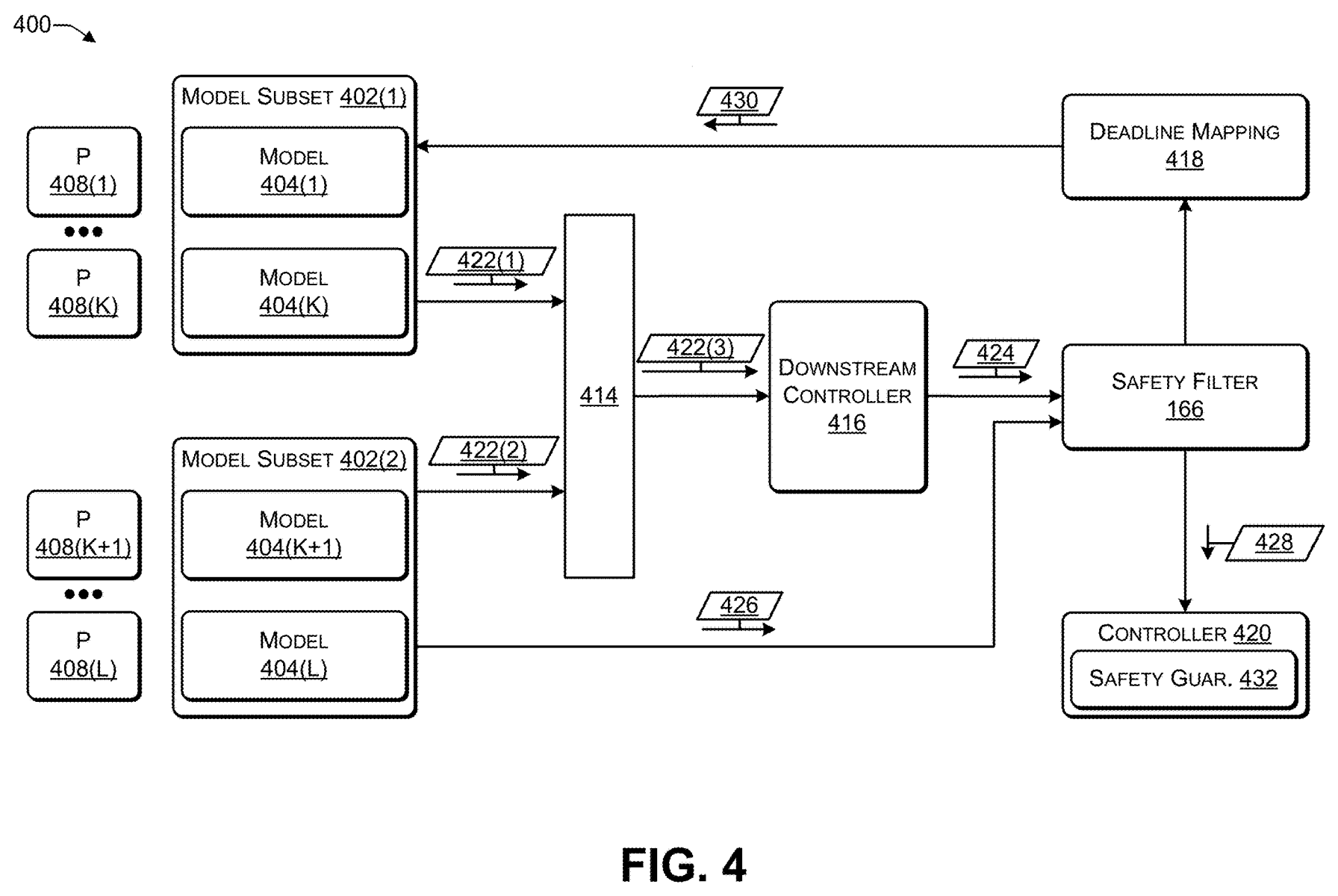

FIG. 4 illustrates a diagram 400 of a multi-sensor autonomous system pipeline, according to some embodiments. FIG. 4 illustrates how the systems and techniques described in FIGS. 1, 2, and 3 may be implemented in modular, multi-sensor autonomous driving pipelines. As previously discussed in FIG. 2, the safety function 168 uses state estimates x 426 (state 148 of FIG. 1) as input to the controller shield 145 and runtime safety monitor 144. The composition of modern autonomous system pipelines may be used to divide AI processing models into two subsets: (1) a subset 402(1) which can benefit from offloading and (2) a subset 402(2) that provides the state estimates used by the safety filter integrated at the end of the pipeline. Therefore, AI models in 402(2) may be included in the state estimators 142(E), 142(L), where they operate at full processing capacity to ensure that updated state estimates, x 426, are constantly fed to the safety filter 166.

δmax denotes a floored discrete-time version of Δmax 430, defined with respect to the sampling periods of the model subsets. To conduct task offloading for critical workloads (such as perception kernels), two aspects are incorporated: (1) remote computing device response times (δ̂) may be estimated to avoid offloads that are not expected to meet processing deadlines and (2) a safety fallback mechanism re-invokes the local neural network if the remote computing device responses, after an offloading decision, are delayed beyond δ̂due to uncertainty (e.g., wireless connectivity issues), and are predicted to miss the critical deadline (e.g., δmax).

At the start of each time interval, if the local neural network and the remote neural network meet a global safety deadline (δi<δmax), then Si is compared to δ̂ (the remote computing device response time estimate). If δi≤δ̂ then offloading is not feasible as there is no fallback period, and the neural network has the instructions processed by the local neural network. Otherwise, offloading the instructions is selected with two potential outcomes: (i) if responses are received before (δmax-δi), then they can be applied directly as processing outputs, and thus, local compute is avoided and energy gains are realized and (ii) if (δmax-δi) expired before receiving a response from the remote computing device, then the local computing device is used to perform computations in the last period for safety.

To realize energy efficiency gains for the vehicle 101 of FIG. 1 while preserving safety guarantees 432, a set of processing models (e.g., neural networks) deployed on an autonomous computing system may be divided into model subsets 402(1) and 402(2) according to their criticality, where critical models 404(1) to 404(K) in 402(2) are tasked with continually providing a state estimate 426 to the safety controller 420 (safety monitor 144) to uphold formal safety guarantees 432. Therefore, the models in 402(2) may operate at or near full processing capacity to provide the most recently determined state estimates 426 to the safety filter 166. The models 404(K+1) to 404(L) (0<K<K+1<L, L>2) in the model subset 402(1) output data that is not used for safety state estimation, and may benefit from supported runtime performance modifications to create modified output 424 to adapt their computational workloads. The main control pipeline involves the controller 420 processing aggregate predictions 422(3)=422(1)+422(2) from the model subsets 402(1), 402(2), respectively. The modifications to adapt the computational workloads are applied in a context-aware, adaptive manner to limit the safety controller 240 overriding control procedures.

The safety filter 166 ensures that raw control predictions are confined within the boundaries of a safety function while accounting for the system dynamics of motion. As illustrated in FIG. 4, the safety filter 166 evaluates safety boundaries on the corresponding state estimates generated from the model subset 402(2) and accordingly filters control predictions 424 to create filtered predictions 428 that are fed to the controller 420. An example of such a filter is the controller shield 145 that is designed to filter steering angle outputs for autonomous driving control. As described in FIG. 3, the controller shield 145 models a vehicle's dynamics relative to a fixed point in the plane (e.g., an obstacle) and extracts the relative distance and orientation angle as the inputs 426 to the safety filter 166. The inputs 426 are used to evaluate the safety function 168 of FIG. 1 with respect to the obstacle, e.g., specifying the set of safe states and control for the vehicle with respect to the obstacle. In this way, the controller shield 145 is able to receive vehicle steering angles and apply corrections if needed.

Characterization of Safe Interval Time

Given the continuity exhibited by the autonomous driving system 164 of FIG. 1 with regards to its dynamics of motion, an expression for the progression (of the vehicle 101) as a function of time can be derived. Based on the system state, with respect to a reference point in the plane (e.g., an obstacle), safety expiration times 430 can be obtained. Such a mapping function has been derived for the autonomous driving controller shield 145, where the autonomous vehicle's relative states with respect to an obstacle can be mapped to corresponding safety expiration times. Specifically, computed $\Delta_{max}$ values based on the corresponding state (distance to obstacle and its relative orientation angle) can be leveraged as dynamic execution deadlines for the models in 402(1). For example, a vehicle driving head on towards an obstacle within a short distance may lead to low values, which in turn cause the models in 402(1) to process inputs at near-full capacity due to the higher perceived risk. Through enough evaluations of the safety expiration function, a low-cost proxy lookup table, denoted as T(x, u), is constructed to enable real-time sampling of values at runtime.

Runtime Control and Safety-Aware Optimization

FIG. 5 illustrates an example algorithm 500 (using pseudo-code) of a runtime control loop experienced by an autonomous system with support for safety aware optimizations, according to some embodiments. An additional notation is y representing the input to the ith sensory model. Line 3 shows the estimation of a new state, x 426, and features, $\Theta ii$ 422(2) from the 402(2) models of FIG. 4 to be fed to the safety filter 166 and the main controller 420, respectively. Lines 4-6, show the main control execution path in which generated controls u are filtered through $\Psi$ to attain safe control actions. Lines 7-11 indicate the start of a new safe optimization interval in which a new value is sampled from T and discretized to $\delta_{max}$ based on the unified timing axis, whereas all expiration flags are reset for the 402(1) models. The Lines 13-21 presents our safety-aware model optimization for each involved pipeline $Ni \in$ 302(1) based on its discretized operational period, $\delta i$, following equation (6).

$$\hat{N}_{i[0:\delta_{max}-\delta_i]} = \begin{cases} \Omega_{i[0:\delta_{max}} - 2\delta_i] + N_{i(\delta_{max}-\delta_i)} & \text{if } \delta_i < \delta_{max} \\ N_{i[0:\delta_{max}-\delta_i]} & \text{otherwise} \end{cases} \quad (6)$$

The full model version, Ni, may be invoked either when $pi > \delta_{max}$ (no surplus optimization periods), or when $\delta_{max}$ expires. Energy optimizations may be applicable in that time step through Qn. Prediction outputs may be added from each model to $\Theta i$ for $\pi$'s control outputs predictions in the following control loop. Lines 22-23 illustrate that after the optimization interval has expired for all deadlines, new flag may be set to sample new value in the next time step.

Safe Energy Optimization Methods

Figure 6:
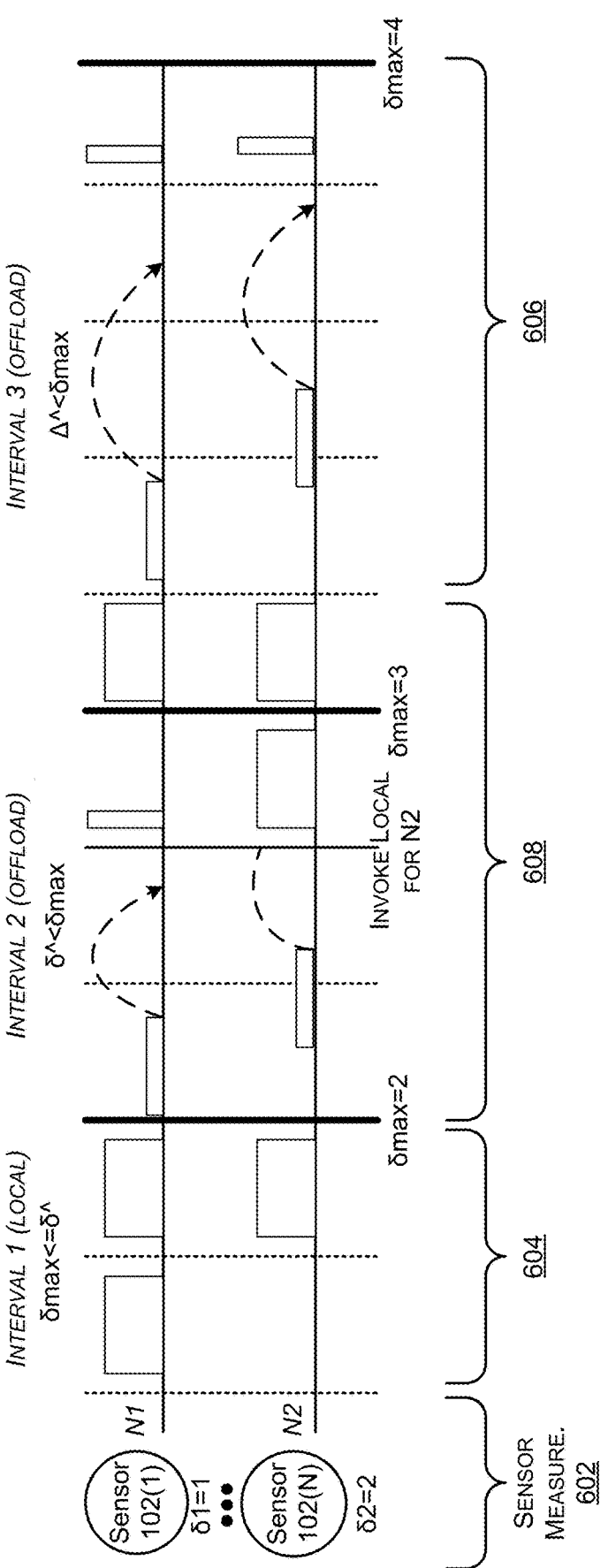
FIG. 6 illustrates an example of task offloading with safety guarantees, according to some embodiments.

FIG. 6 illustrates an example of task offloading with safety guarantees, according to some embodiments. Two methods may be used for $\Omega$ to influence the operation of $N^{\hat{}}$ in equation (6). Task offloading is performed by wirelessly offloading compute-intensive tasks from the local computing device to one or more remote computing devices (e.g., servers or virtual servers in the cloud) located on the edge (of a network). Task offloading provides considerable energy efficiency gains for the local computing device 140 of FIG. 1. To conduct task offloading for critical workloads (such as perception kernels affecting downstream control decisions of an autonomous vehicle), there are two aspects to be incorporated: (1) server response times ($\delta^{\hat{}}$) are estimated to avoid offloads that are not expected to meet processing deadlines and (2) a safety fall back mechanism is used to re-invoke the local NN model if server responses (after an offloading decision) are delayed beyond $\delta^{\hat{}}$ due to wireless uncertainty (or another type of uncertainty), and are therefore estimated to miss the critical deadline (e.g., $\delta_{max}$). The offloading logic may be incorporated into an optimization function, e.g., equation (6).

Sensor measurements are obtained at 602. At the start of every time interval, every AI model that meets the global safety deadline ($\delta i < \delta_{max}$), proceeds to compare its $\delta i$ against $\delta^{\hat{}}$. If $\delta i < \delta^{\hat{}}$, then offloading is not feasible as there exists no fallback periods, and the model proceeds to evaluate locally, as show in in 604. Otherwise, offloading is chosen with two potential outcomes: (i) if responses are received before ($\delta_{max} - \delta i$), then they can be applied directly as processing outputs, and thus, local compute is avoided and energy gains are realized, as show in in 606 or (ii) if ($\delta_{max} - \delta i$) expired before receiving server responses, then the local model is instantiated to compute in the last period for safety, as shown in 608. Given an optimizable model $N^{\hat{}}$ (see equation (6)), characterize its energy consumption when offloading (case 1 in equation 6) at a discrete period, n, as follows:

$$E_{\hat{N}} = T_{tx} \underset{E_{\Omega}}{\cdot} P_{tx} + \mathbb{1}\left[n == \left(\delta_{max} \underset{E_N}{=} \delta_i\right)\right] \cdot T_N \cdot P_N \quad (7)$$

where $T_{tx}$ and $P_{tx}$ are the respective transmission latency and I[•] is an indicator function to invoke local processing if the guarantee on safety expires. In this case, the system incurs additional energy consumption equal to the product of N's local processing overheads in terms of latency, TN and power consumption, PN. Though subscript, n, is omitted for notational simplicity, $T_{Tx}$ and $P_{Tx}$, evaluations are dependent on n because some offloading overheads may traverse multiple windows.

Gating Mechanisms

Figure 7:
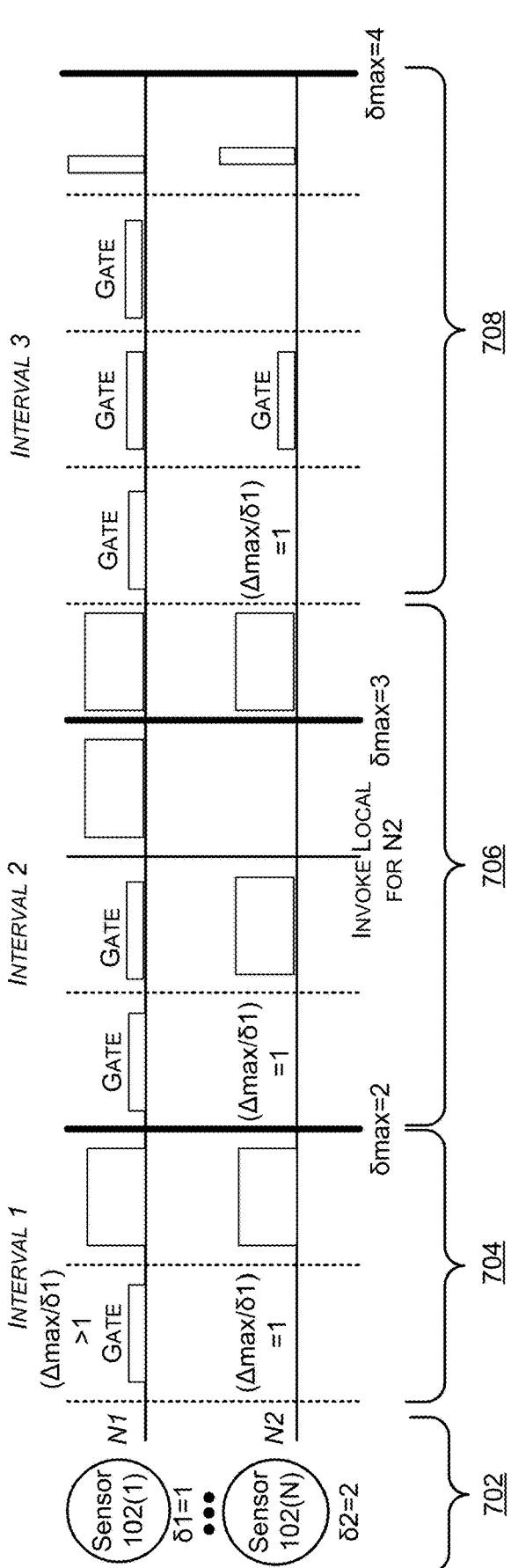
FIG. 7 illustrates using a gating mechanism with safety guarantees, according to some embodiments.

After describing offloading optimization and gating optimizations, an alternative that is energy-efficient and that showcases how the runtime safety monitor can be generalized is now illustrated. FIG. 7 illustrates using a gating mechanism with safety guarantees, according to some embodiments. In the gating mechanism, given $\delta i < \delta max$, the processing model is gated until the final interval period, for energy efficiency. In addition, the sensor measurements 702 can be gated when the timeline is synchronized to their sampling periods, $\tau$. In such case, energy consumption for both gating and computing periods may be modeled as:

$$E\Omega = \tau \cdot Pmech, \quad EN = \tau \cdot (Pmech + Pmeas) + TN \cdot PN \quad (8)$$

in which Pmech and Pmeasure are the power drawn by the sensor due to its mechanical and measurement operations. This separation is because gating cannot be directly applied to the mechanical aspects of the sensor, such as a rotating motor, due to inertia considerations. For instance, a LiDaR sensor motor needs to keep on rotating even if sensor measurement is gated. 704, 706, and 708 illustrate different length gating intervals.

Experimental Setup

A simulation environment (e.g., CARLA) is used to implement an experimental scenario similar to the one proposed herein in which a Reinforcement Learning (RL) agent is trained as an autonomous vehicle controller (driving controller 146) to travel along a 100 m road that is populated with obstacles in the final third of the road. The agent is trained using the same reward function for 2000 episodes to output steering and throttle control actions. To reflect the $\Delta$ii and $\Delta$i components that feed inputs into the agent, the Variational Autoencoder, $\Delta$ii, is reused. In addition, two pretrained ResNet-152 object detectors are deployed for $\Delta$i, where they operate at respective periods p=$\tau$ and p=2$\tau$ to imitate sensor operational diversity. Unless otherwise stated, r is set to 20 milliseconds (ms) based on the literature and benchmark datasets.

The analysis for energy optimizations is conducted under both cases for when the safety component tasked with filtering steering angle outputs is (1) active and (2) inactive, referred to as filtered and unfiltered, respectively. The results are the average of 25 test runs in which the agent successfully completed the route without any collisions in either of the above cases. The state estimates (i.e., distance and relative orientation) used by the safety component are retrieved directly from the simulation environment (CARLA) for simplicity.

For performance comparisons, the following scheme is proposed for both local and offloaded performance characterizations in terms of latency and energy consumption. Due to space considerations, a high-level overview is provided for the former (latency), by deploying the ResNet-152 models on an Nvidia Drive PX2 ADS platform, and benchmarking their local execution overheads using TensorRT in terms of latency and energy (17 ms latency and 7 Watts execution power consumption). For offloading, assume a Wi-Fi link in which effective data rate values are sampled from a Rayleigh channel distribution model with a scale of 20 Mbps.

Energy Gains under Safety Guarantees

Figure 8:
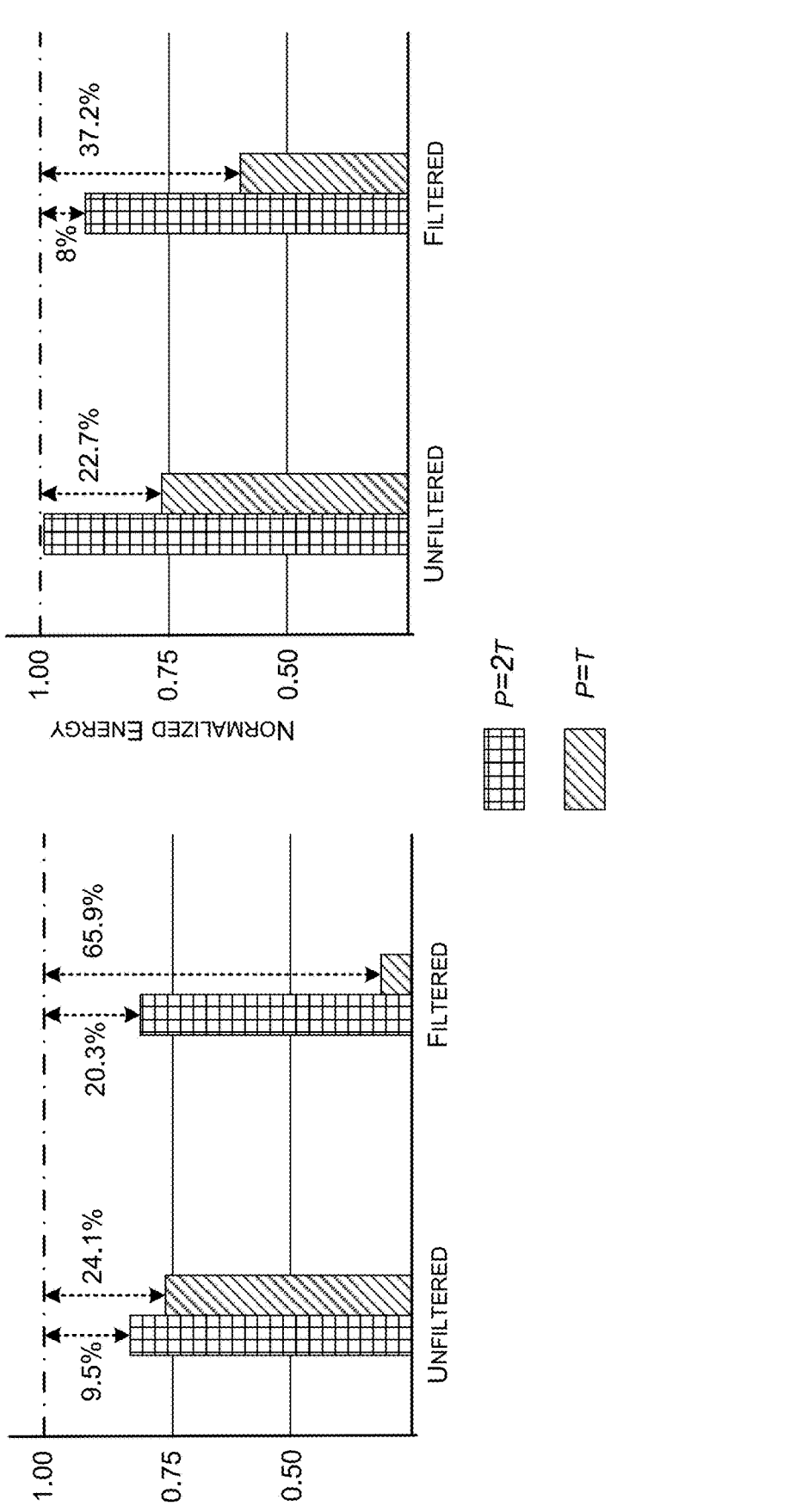
FIG. 8 illustrates energy gains relative to local execution for offloading and model gating, according to some embodiments.

FIG. 8 illustrates energy gains relative to local execution for offloading and model gating, according to some embodiments. To analyze the extent of energy gains under the dynamic safety execution deadlines, $\delta$max, FIG. 8 illustrates the extent of energy gains that can be realized across two detectors (ResNet-152) using offloading and model gating optimization techniques for both the unfiltered and filtered cases. Based on the results, two key observations can be made. The first key observation is that synchronizing the AI models to sensors with higher sampling frequencies is more likely to receive greater benefit from the optimizations described herein. For example, a 65.9% energy gain experienced by the detector at p=$\tau$ compared to a 20.3% gain experienced by its p=2$\tau$ counterpart in the filtered offloading case (which is attributed to the former's higher prospect of optimizations under lower values of $\delta$max). The second key observation is that energy gains in the filtered case are more than the unfiltered case, e.g., 65.9% vs 24.1% at p=$\tau$ for offloading. This is primarily because the safety component causes the RL agent to maintain a healthy distance from the obstacles by effective maneuvering, which in turn causes higher values of $\delta$max to be sampled, resulting in more optimizations for both models. The experiments in Table I are repeated while varying the base period $\tau$ as a case of more limited hardware settings. As shown, considerable energy gains, are still be attainable, 21.1% and 14.5% on average for respective offloading and gating.

Offloading and Gating Energy Gains Over Local at $\tau$=25 Ms

TABLE 1

| Mode | Control | (p − $\tau$) gains | (p − 2$\tau$) gains | Average gains |
|---|---|---|---|---|
| Offload | Unfiltered | 15.3% | 7.5% | 11.8% |
| | Filtered | 27.1% | 14.1% | 21.1% |

TABLE 1-continued

| Mode | Control | (p − $\tau$) gains | (p − 2$\tau$) gains | Average gains |
|---|---|---|---|---|
| Gating | Unfiltered | 13.4% | 0% | 6.6% |
| | Filtered | 23.8% | 4.3% | 14.5% |

Energy Efficiency Gains Under Varying Risk Levels

FIG. 9 illustrates energy efficiency gains for EnergyShield with respect to continuous local execution and to safety analysis, according to some embodiments. To assess the systems and techniques described herein under varying degrees of risk, the number of obstacles on the vehicle's trajectory may be varied and the change in performance efficiency measured. 902 illustrates EnergyShield's energy efficiency gains with respect to continuous local execution while 904 illustrates safety analysis in terms of the R evaluation and percentage track completion rates (TCR). Across both potential optimization cases, the histogram shows that lesser values of $\delta$max are sampled more frequently as the number of obstacles increase. For instance, $\delta$max=4 occurrence frequency decreases from 33.3% to 6.48% to 2.3% in the model gating approach as the number of obstacles increase from 0 to 2 to 4. This influences energy efficiency gains accordingly as indicated by the progressive drop in the average energy efficiency numbers. In Table II, the results for the filtered case are provided. Interestingly, the average energy gains and experienced $\delta$max values start to saturate when the number of obstacles 22. This is again attributed to minimum safety distance imposed by the safety filter leading to more evaluations of $\delta$max>1.

Average Energy Gains $\delta_{MAX}$ at $\tau$=20 Ms Obstacle Variation for Two Combined (p=$\tau$) and (p=2$\tau$) Models

TABLE II

| Control | #Obst. | Offloading Gains | Gating Gains | $\delta_{MAX}$ |
|---|---|---|---|---|
| Unfiltered | 0 | 88.58% | 42.92% | 3.67 |
| | 2 | 24.6% | 17.47% | 2.29 |
| | 4 | 16.82% | 11.89% | 1.92 |
| Filtered | 0 | 89.89% | 43.82% | 3.7 |
| | 2 | 39.49% | 24.26% | 2.61 |
| | 4 | 43.1% | 22.57% | 2.53 |

Sensor Gating

The gating analysis may be extended to include a broader energy consumption model of both the neural network processing model and the sensor itself (equation 8). The measurement power specifications for industry-grade sensors commonly used in autonomous systems are used, such as, for example: a ZED Stereo Camera, a Navtech CTS350-X Radar, and a Velodyne HDL-32e LiDAR. Pmeas=2.4 W is used for the LiDAR's rotation power consumption, based on common LiDAR motors. The numbers are provided in Table III, which also compares energy gains experienced by each sensor model, both on average during the test run and when $\delta$max was sampled equivalent to 4$\tau$. As shown, energy gains for the camera pipeline achieves the best scores (37.5% and 8.2% on average) compared to the other sensory pipelines This energy gain is because the absence of residual energy consumption (due to Pmech) further increases gating efficiency. Between the Radar and LiDAR, the RADAR is more efficient (e.g., 34.84% vs. 32.72% on average at p=$\tau$) as a result of the higher Pmeas (21.6 W) rating, which means that it is more susceptible to benefit from sensor gating optimizations.

Sensor Gating at τ=20 Ms for Filtered Control Case

TABLE III

| Sensor | $P_{meas}$ | $P_{mech}$ | Avg. Gains | 4τ Gains |
|---|---|---|---|---|
| ZED Camera (p = τ) | 1.9 W | 0 | 37.5% | 75% |
| ZED Camera (p = 2τ) | | | 8.2% | 50% |
| Navtech Radar (p = τ) | 21.6 W | 2.4 W | 34.84% | 68.93% |
| Navtech Radar (p = 2τ) | | | 7.57% | 45.53% |
| Velod. LiDAR (p = τ) | 9.6 W | 2.4 W | 32.72% | 64.82% |
| Velod. LiDAR (p = 2τ) | | | 6.9% | 41.91% |

Thus, the systems and techniques provided herein include a safety-aware energy optimization framework for multi-sensor autonomous systems at the edge that regulates how runtime energy optimizations are applied to the involved processing pipelines. Experiments using two common energy optimization techniques for a simulated multi-sensor autonomous vehicle in a simulated environment (e.g., Carla) show that substantial energy gains, up to 89.9%, can be achieved while preserving the desired safety properties. Experimental Setup Operational Policies: In addition to a baseline continuous local execution 1002, the EnergyShield (controller shield 145) may use two offloading modes: eager 1004 and uniform 1006. Eager 1004 is an offloading period that is immediately started if an edge response has been received at the ADS 164 or Δmax expires. In Uniform 1006, the start of a new offloading interval is delayed until Δmax expires, regardless of whether edge responses have been received or not.

Figure 10:
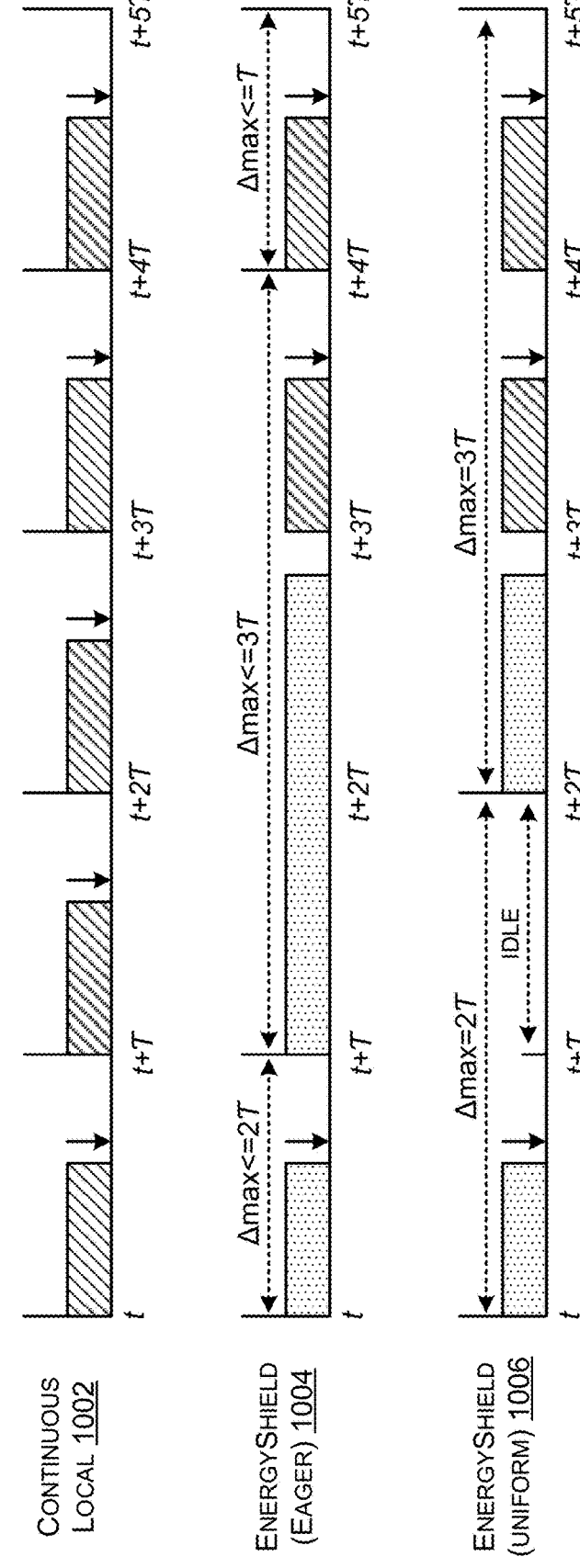
FIG. 10 illustrates an offloading interval in which a uniform EnergyShield idles upon its retrieval of the edge responses until $\Delta max$ expires, according to some embodiments.

FIG. 10 illustrates an offloading interval in which a uniform EnergyShield idles upon its retrieval of the edge responses until Δmax expires, according to some embodiments. Both modes reflect the attainable behavioral trade-offs of EnergyShield (controller shield 145) with regard to realizing a particular control behavior or maximizing energy efficiency. This distinction is illustrated through the first offloading interval in FIG. 10 in which the uniform Ener-gyShield idles upon its retrieval of the edge responses until Δmax expires, unlike the eager EnergyShield mode.

Figure 11:
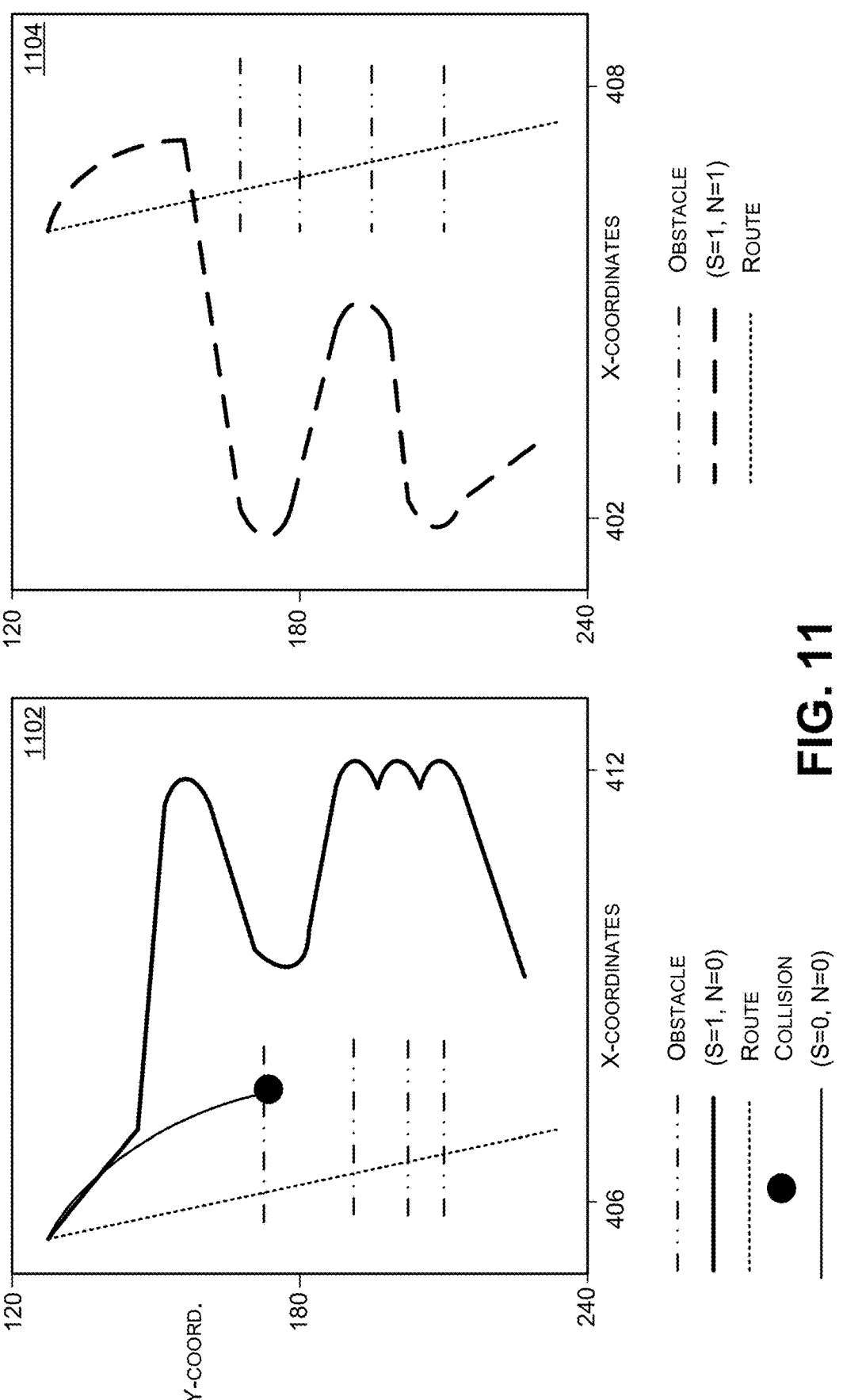
FIG. 11 illustrates a vehicle's trajectories across three episodes of dissimilar (S, N) configurations, according to some embodiments.

FIG. 11 illustrates a vehicle's trajectories across three episodes of dissimilar (S, N) configurations, according to some embodiments. FIG. 11 illustrates data obtained from experiments performed using an open-source simulator (e.g., CARLA or similar) for autonomous driving research. The scenarios involves a four-wheeled vehicle travelling from a starting position A to a destination B along a 100 m motorway track, with 4 obstacles (e.g., pedestrians) in the path. The first obstacle spawns after 40 m of the track, while the remaining spawning positions are uniformly spaced between the first obstacle's position and that of the final destination, with a potential ±10 m variation along the longitudinal axis. The experiments were conducted under different combinations of the following two binary configuration parameters: S: a binary variable that indicates whether the Controller Shield component is active and N: a binary variable that indicates whether this is a more challenging, "noisy" version of the experimental test case. In particular, the noisy version entails perturbing the obstacles' spawning positions by adding values sampled from a normal distribution 0, 1.5 m along both the longitudinal and latitudinal axis. For example, the configuration settings (S=1, N=0) indicate that the experiment was performed with Controller Shield 145 active and with no perturbations in the obstacles' spawning positions.

In the simulation setup, for the controller model (driving controller 146), a first stage entails two concurrent modules: (i) an object detector as the large NN model of the ADS 164 and a β Variational Autoencoder (β-VAE) providing additional latent feature representations of the driving scene. Both components operate on 160 80 RGB images from the vehicle's attached front-facing camera. In the subsequent stage, a Reinforcement Learning (RL) agent aggregates the detector's bounding box predictions, latent features, and the inertial measurements (δc, v, and f and α) to predict vehicle control actions (steering angle and throttle).

The inertial measurements may be retrieved directly from the simulation (CARLA), whose positional and orientation measurements may also be used directly to calculate r and ξ relative to the vehicle's current nearest obstacle, for obstacle state estimation. The RL controller agents (driving controller 146) are trained using a reward function that is designed to maximize track completion rates through collision avoidance while minimizing the vehicle's center deviance from the primary track.

The primary RL agent training is conducted under the (S=0, N=0) configuration settings using the Proximal Policy Optimization (PPO) algorithm for a total of 1800 episodes. In the last 400 training episodes, the ego vehicle's spawning position and orientation is randomized along its lateral dimension to aid the agent in learning how to recover from maneuvering moves. For the β-VAE, we used a pretrained model that was trained to generate a 64-dimensional latent feature vector from CARLA driving scenes. The reward function R is defined as:

$$\mathcal{R} = \begin{cases} -P, & \text{collision or } CD > CD_{th} \\ +P, & \text{track completed successfully} \\ f_R(v, CD, \vartheta, r), & \text{otherwise} \end{cases}$$

P is a large positive number, v is the vehicle's velocity, CD is the vehicle's center deviance from the center of the track, CDth is a predetermined threshold value, θ represents the angle between the heading of the vehicle and the tangent to the curvature of the road segment, and r is the distance to the closest obstacle. As shown, R can evaluate to: (i) (+P) if it completes the track successfully (large positive reward), (ii) (−P) if it incurs a collision or deviates from the center of the road beyond CDth, or (iii) a function fR(•) of the aforementioned variables.

Performance Evaluations: A pretrained ResNet-152 is used as an object detector. Its performance is benchmarked in terms of latency and energy consumption when deployed on the industry-grade Nvidia Drive PX2 Autochauffer ADS. A single inference pass on the ResNet-152 takes about 16 ms, and accordingly, the time-step in CARLA was set at 20 ms because the detector-in-the-loop may be the simulation's computational bottleneck. To evaluate the wireless transmission power, the data transfer power models are used, assuming a Wi-Fi communication link.

Wireless Channel Model: The communication overhead is modeled between the ego vehicle and edge server as: Lcomm=LT x+Lque s.t. LT x=frac{\mathrm{\data_size\}}{\phi} where Lque represents potential queuing delays at the server and LT x is the transmission latency defined by the size of the transmission data, data_size, over the experienced channel throughput, φ. Here, assume φ as the "effective" channel throughput experienced at the ego vehicle, which takes into consideration potential packet drops, retransmissions, etc. A Rayleigh distribution model (or similar) is leveraged to sample throughput values $\phi$ Rayleigh 0, $\sigma\phi$ with zero mean and $\sigma\phi$ scale (default $\sigma\phi$=20 Mbps).

EnergyShield Evaluations

The purpose of this experiment is to assess the performance of the driving controller 146 when supplemented with EnergyShield in terms of energy efficiency and safety. For every configuration of S and N, the test scenario is run for 35 episodes and their combined results aggregated. The energy efficiency gains provided by EnergyShield are compared to the baseline continuous local execution. As illustrated FIG. 9, the left barplot 902 demonstrates that both modes of EnergyShield substantially reduce the energy consumption footprint of the NN compared to local execution across all S and N configurations. For example, under the default configuration (S=0, N=0), EnergyShield energy reductions reach 20% and 40.4% for the eager and uniform modes, respectively. These numbers further improve for the subsequent configurations in which N=1 or S=1. This is the result of the ego vehicle encountering more instances in which obstacles are not in the direct line-of-sight of its heading. The reasons for this is because, at N=1, some obstacles can be displaced out of the primary lane that the ego vehicle follows to complete the track, whereas at S=1, such instances result from the Controller Shield 145 applying corrective behaviors on the NN's predicted steering outputs, resulting in more tangential orientations of the vehicle with respect to the obstacles (i.e., $\xi\ \pi\ 2$). Accordingly, large values of $\Delta$max—about 4-5 time samples (equivalent to 80-100 ms)—are increasingly sampled, which automatically translates into more offloading decisions. For example, at (S=1, N=0), the energy efficiency gains reach 24.3% and 54.6% for the respective eager and uniform modes.

Safety Evaluation: To assess the EnergyShield's ability to enforce safety, track completion rates (TCR %) are used as a comparison metric to signify the proportion of times the vehicle is able to complete the track without collisions. Taking the local execution mode as the test scenario, the right barplot 904 of FIG. 9 shows that without an active Controller Shield 145 (S=0), collisions with the pedestrian obstacles cause the TCR % to be 65.7% at N=0, and even less at 22.9% for the noisy test case (N=1). However, when the Controller Shield 145 is active (S=1), collisions are completely avoided and the TCR (%) values jump to 100% for both cases. This is also visible through the respective improvements in which reached 13.3% and 61.1%. To further demonstrate such occurrences, in FIG. 11, the ego vehicle's chosen trajectories are shown across 3 episodes of dissimilar (S, N) configurations. As shown, the (S=0, N=0) instance 1102 incurs a collision with the pedestrian object and does not complete the track. An active Controller Shield 145 (S=1), however, enforces a left or right corrective maneuvering action for obstacle avoidance and maintaining safety as shown in 1104.

Figure 12:
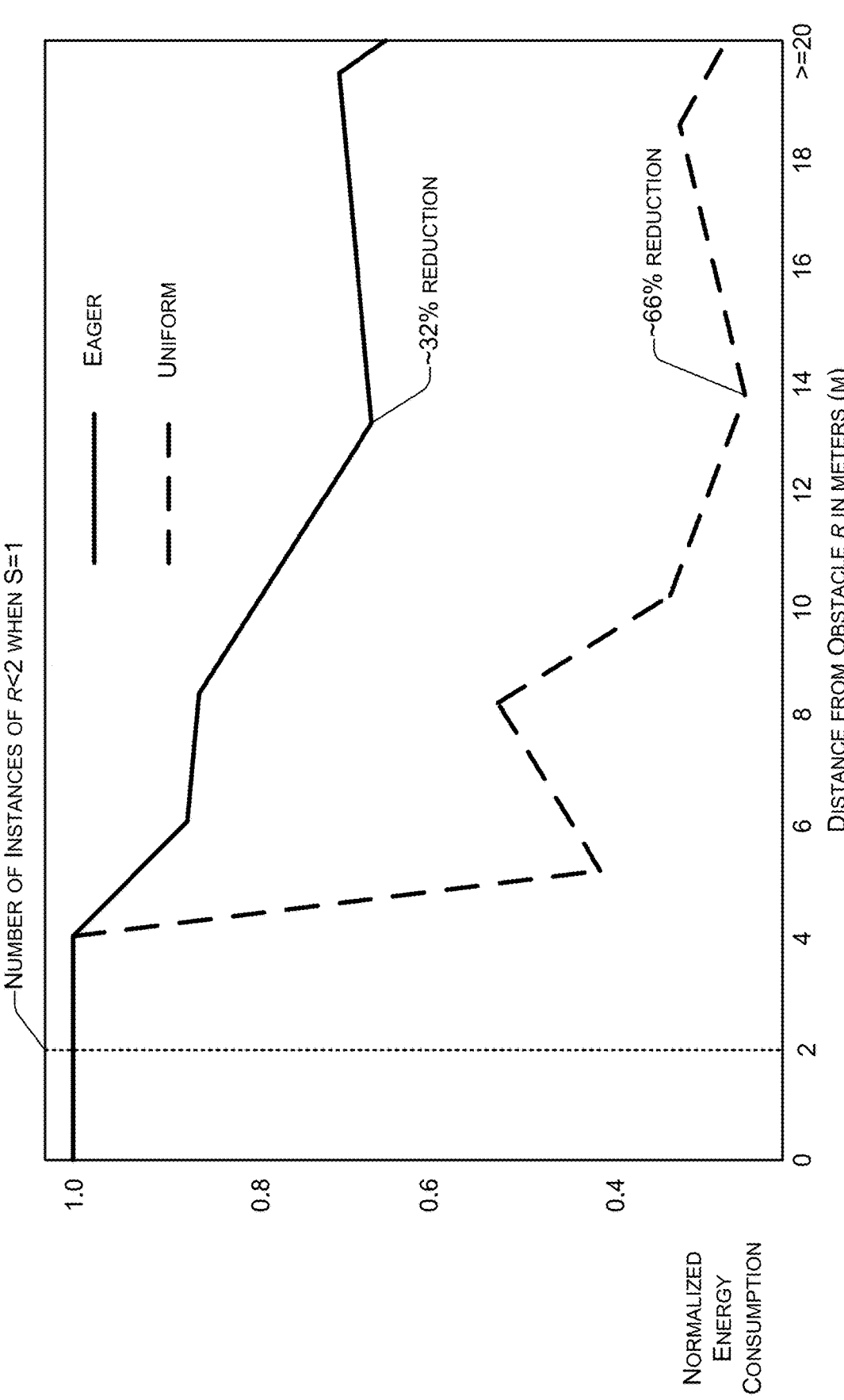
FIG. 12 illustrates normalized energy gains for eager and uniform EnergyShield modes with respect to a distance from an obstacle, according to some embodiments.

FIG. 12 illustrates normalized energy gains for eager and uniform EnergyShield modes with respect to a distance from an obstacle, according to some embodiments. In FIG. 12, an average experienced normalized energy ratings of two modes of EnergyShield is plotted with respect to local execution against a distance from an obstacle (r) across individual configuration's set of multiple episodes. Energy vs. Distance: To assess how representative the $\Delta$max upper bounds provided by the Runtime Safety Monitor are of the corresponding driving scene context, we examine EnergyShield's energy consumption at different distances from the nearest obstacle (r). The hypothesis is that larger r values imply relatively "safer" driving situations, which would result in larger values of $\Delta$max to be sampled, and accordingly more offloading instances enhancing the NN's energy efficiency. As shown in FIG. 12, the average experienced normalized energy ratings of the two modes of EnergyShield are plotted with respect to local execution against r across every configuration's set of 35 episodes. Each tick on the horizontal axis accounts for an entire range of 1 m distances rather than a single value—e.g., a value of 2 on the horizontal axis encompasses all distances in the range [2-3). At close distances (r<4 m), FIG. 12 shows that EnergyShield modes incur almost the same energy consumption overhead as that from the default local execution. This is mainly accredited to the Runtime Safety Monitor recognizing the higher risks associated with the close proximity from the objects, and accordingly outputting smaller values of $\Delta$max that can be satisfied by local execution. As the distance from obstacles increases, so do the values of $\Delta$max, causing a gradual increase in the number of offloading instances, followed by a progressive reduction in energy consumption. For instance, the eager and uniform modes achieve 32% and 66% respective reductions in energy consumption at r=13 m for the (S=1, N=1) configuration. Even more so, all configurations of the respective eager and uniform modes at the (r>20 m) bracket realize 33% and 67% respective energy gains.

Wireless Channel Variations

Figure 13:
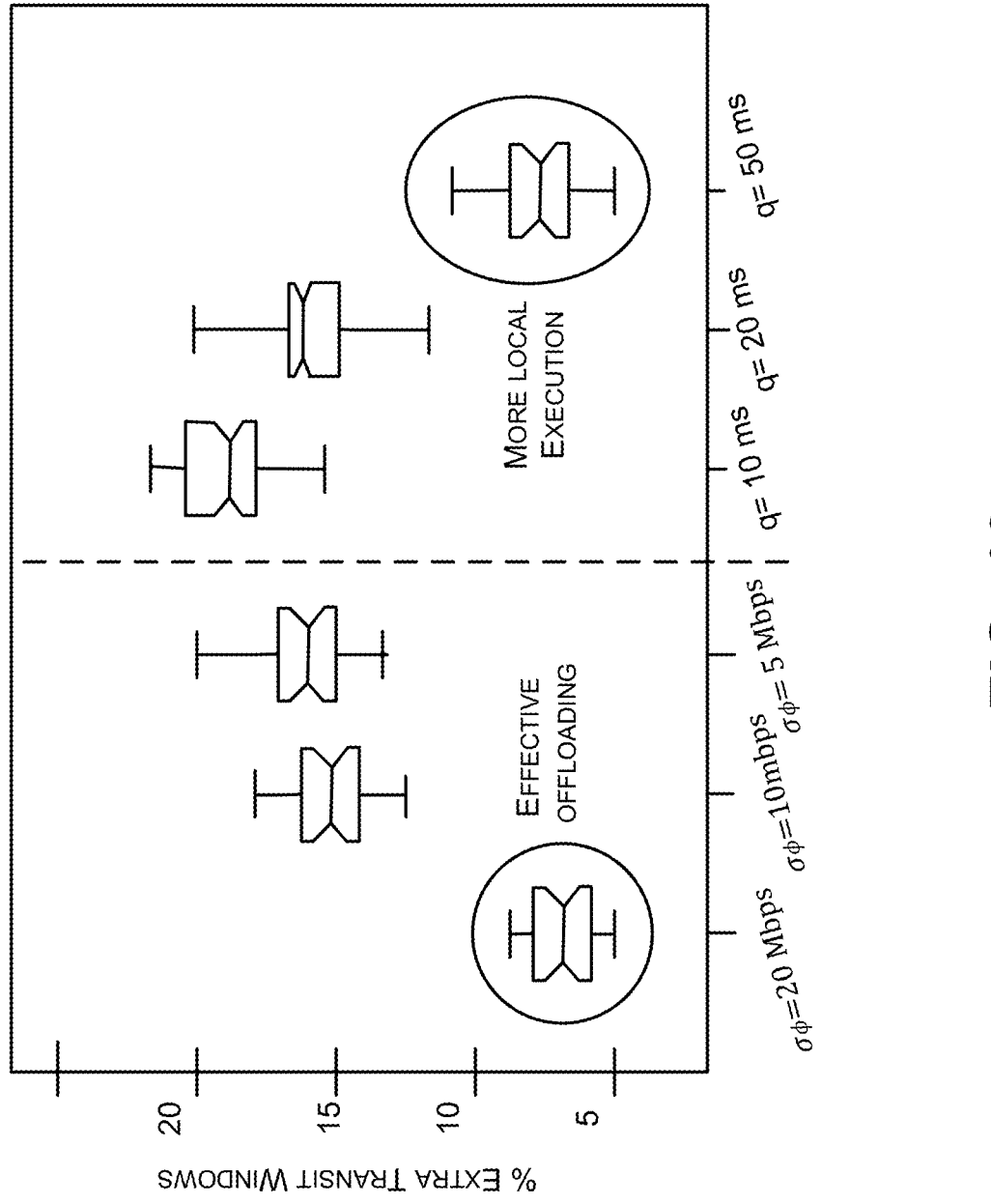
FIG. 13 illustrates, for a uniform EnergyShield, how an extra transit window drops for contrasting conditions of high throughput and high queuing delays, according to some embodiments.

FIG. 13 illustrates, for a uniform EnergyShield, how an extra transit window drops for contrasting conditions of high throughput and high queuing delays, according to some embodiments. This experiment assesses how the performance gains of EnergyShield are affected by variations of the wireless channel conditions. Specifically, this experiment determines to what extent changes in the channel throughput ($\phi$) or the queuing delays (q) change the energy savings provided by EnergyShield. Additionally, for each set of experimental runs, what percentage of their total elapsed time windows are extra transition windows used to complete a single offloading instance, denoted by a % Extra Transit Windows metric. First, the effects are analyzed when varying $\sigma\phi\in\{20, 10, 5\}$ Mbps given a fixed q=1 ms, and then when varying q$\in\{10, 20, 50\}$ ms given a fixed $\sigma\phi$=10 Mbps. For the uniform EnergyShield, FIG. 13 illustrates that the % Extra Transit Windows drops for the contrasting conditions of high throughput ($\sigma$phi=20 Mbps) and high queuing delays (q=50 ms), reaching medians of 7% and 8%, respectively. This may be understood in terms of how the benign channel conditions ($\sigma\phi$=20 Mbps) indicate that the majority of offloading instances are concluded in a single time window with no considerable need for extra transmission windows. In contrast, at unfavorable wireless conditions (q=50 ms), $\Delta\hat{}$ values may exceed $\Delta$max, leading EnergyShield to opt for local execution more often to avoid wireless uncertainty, lowering the total number of transmission windows.

Figure 14:
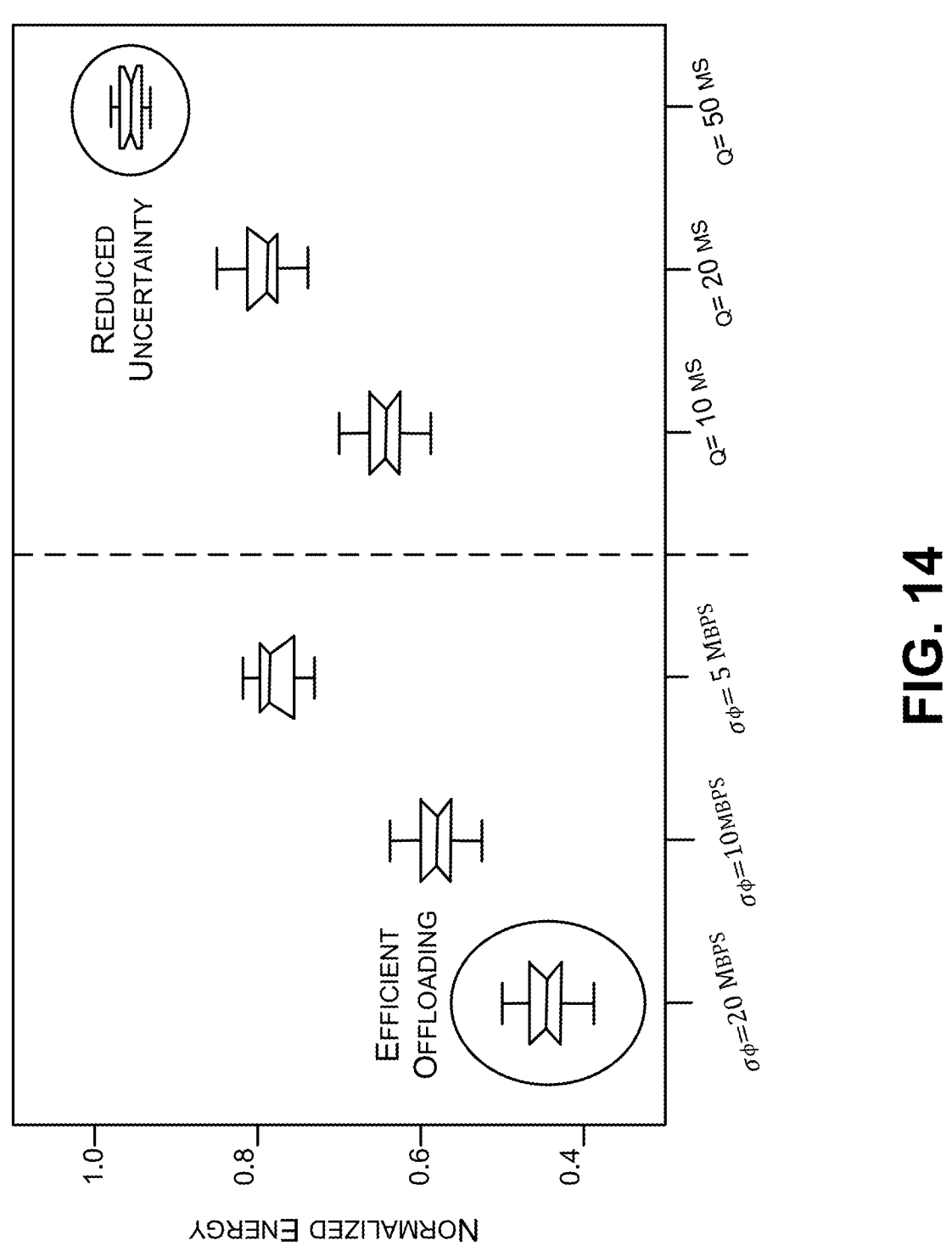
FIG. 14 illustrates analyzing normalized energy over multiple episodes of EnergyShield, according to some embodiments.

FIG. 14 illustrates analyzing normalized energy over multiple episodes of EnergyShield, according to some embodiments. Such effects are also visible in FIG. 14 because EnergyShield's energy consumption varies across these contrasting conditions, reaching respective medians of 45% and 93% of the local execution energy at $\sigma\phi$=20 and q=50.

Generality

FIG. 15 illustrates EnergyShield performance across different reinforcement learning (RL) controllers, according to some embodiments. To assess EnergyShield (controller shield 145), 3 additional RL controllers (e.g., driving controllers 146, 132) are trained to evaluate how consistent EnergyShield (controller shield 145) is with regards to maintaining safety guarantees, and how the energy efficiency gains may vary given a distinctive driving behavior for each agent. Hence, the primary test runs are repeated for the additional controllers, by averaging energy consumption and TCR across 35 episodes of each viable (S, N) configuration. The average center deviance (CD) experienced by the ego vehicle from the primary track lane is reported as a metric to characterize the different driving behaviors of each driving controller 132, 146. In an experimental test case, a larger CD implies larger r values, that is, driving controllers 132, 146 with low values of CD tend to drive closer to the obstacles at higher risks of collisions (maximizing through minimizing CD), whereas larger values of CD indicate the agents have learnt to take the farther lanes of the track to maximize track completions by prioritizing collision avoidance (maximizing by maximizing TCR). The key findings are shown in FIG. 15. The first key finding is that given S=0, (%) is dependent on CD ratings as driving controllers 132, 146 with CD >5 m consistently achieve the 100% TCR. At S=1, however, this dependency may no longer hold when the Controller Shield 145 enforces the obstacle avoidance safety guarantees, thereby pushing controllers 132, 146 to achieve 100% TCR, irrespective of CD values. The other interesting finding here is that across both modes of EnergyShield, the average energy consumption is less for controllers 132, 146 with larger CD ratings. For instance, at (S=1, N=1), when the RL controllers 132, 146 are arranged in an increasing order of their CD values $2.8 \to 3.6 \to 5.4 \to 5.7$ m, the average energy consumption per inference decreases in the respective order $53.1 \to 45.7 \to 42.1 \to 39.8$ mJ. Indeed, this highlights EnergyShield's capability of conducting safe and effective context-aware offloading, especially given how the Runtime Safety Monitor provides large $\Delta$max to realize more energy gains in the safer situations (e.g., larger distances from obstacles), and how the Controller Shield 145 maintains safety guarantees independent of offloading decisions.

Figure 17:
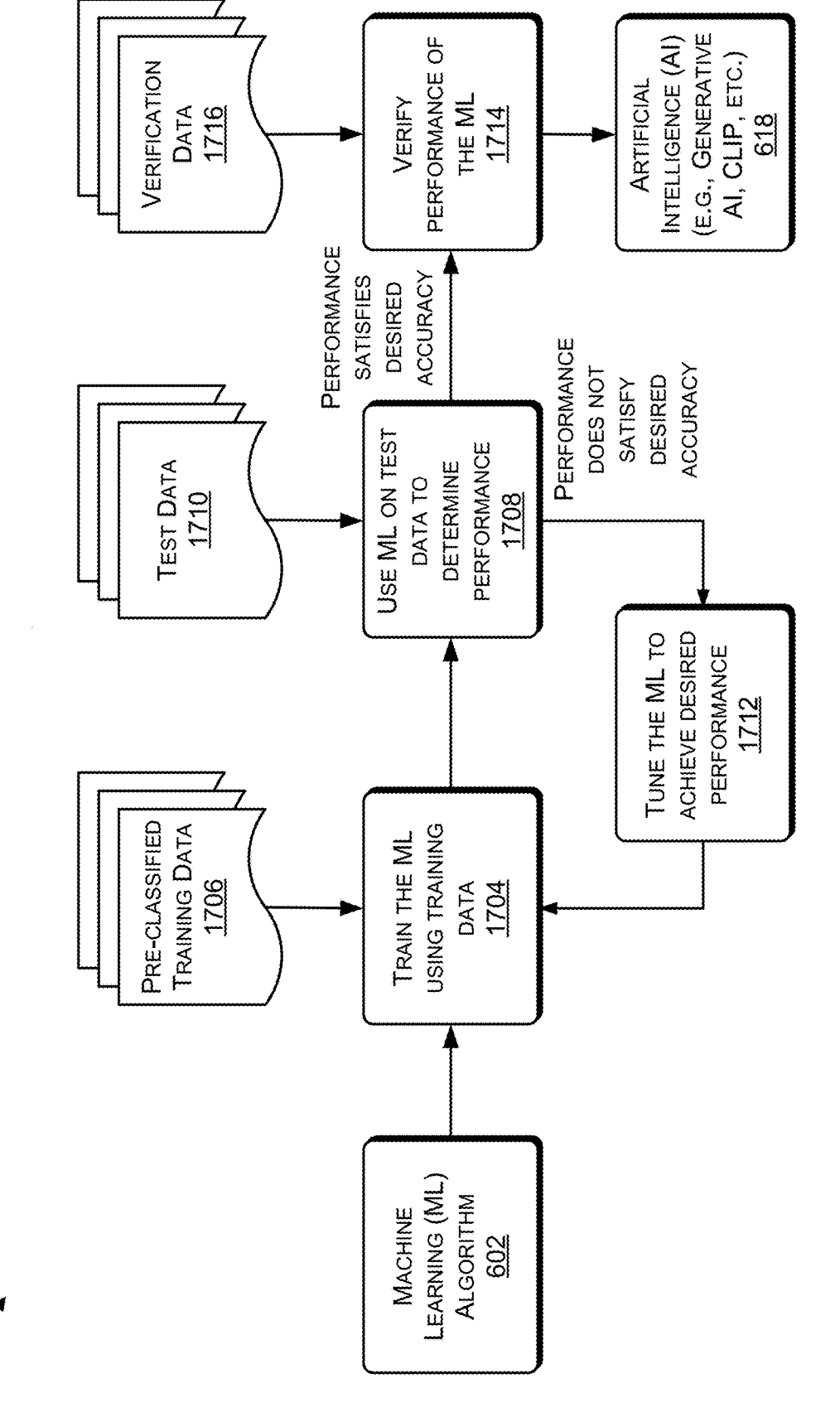
FIG. 17 is a flowchart of a process to train a machine learning algorithm, according to some embodiments.

In the flow diagram of FIGS. 16 and 17, each block represents one or more operations that can be implemented in hardware, software, or a combination thereof. In the context of software, the blocks represent computer-executable instructions that, when executed by one or more processors, cause the processors to perform the recited operations. Generally, computer-executable instructions include routines, programs, objects, modules, components, data structures, and the like that perform particular functions or implement particular abstract data types. The order in which the blocks are described is not intended to be construed as a limitation, and any number of the described operations can be combined in any order and/or in parallel to implement the processes. For discussion purposes, the processes 1600 and 1700 are described with reference to FIGS. 1, 2, 3, 4, 5, 6, 7, 8, 9, 10, 11, 12, 13, 14, and 15 as described above, although other models, frameworks, systems and environments may be used to implement these processes.

FIG. 16 illustrates a process 1600 that includes offloading a workload to a remote computing device, according to some embodiments. The process 1600 may be performed by one or more components of the vehicle 101 of FIG. 1, such as, for example, the local computing device 140.

At 1602, the process may initialize an offloading decision time period. At 1604, the process may determine (by a safety monitor) a maximum wait time to wait (in the offload time period) to receive offload results. At 1606, the process may determine (by a response estimator) an estimate for an offload response time based on packets exchanged so far. At 1608, the process may determine whether one or more offload conditions are satisfied. If the process determines, at 1608, that the offload conditions are satisfied, then the process proceeds to 1610. If the process determines, at 1608, that the offload conditions are not satisfied, then the process proceeds to 1616. For example, in FIG. 1, the safety monitor 144 may initialize an offloading decision time period. The safety monitor 144 may determine the edge response time 149 indicating how long the remote computing device 130 is estimated to be taking to respond to requests, such as the request 154. The safety monitor 144 may determine whether one or more offload conditions are satisfied. If the safety monitor 144 determines that the offload conditions are satisfied, then the safety monitor 144 may cause the request 154 to be sent to the remote computing device 130 to offload a workload to the remote neural network 131. For example, if the edge response time 149 is greater then (i) the maximum acceptable wait time 162 plus (ii) the time taken by the local neural network 141 to process the data stream 150, then the data stream 150 may be offloaded and otherwise the data stream 150 may be processed by the local neural network 141. If the safety monitor 144 determines that the offload conditions are not satisfied, and the safety monitor 144 may cause the workload to be processed locally, by the local neural network 141 (on the local computing device 140).

At 1610, the process may offload (e.g., send) a workload to a remote computing device. At 1612, the process may determine whether an offload result has been received or whether a maximum wait time has been reached. If the process determines, at 1612, that the maximum wait time has been reached, then the process causes the workload to be locally processed to create a result (e.g., local result), at 1614, and proceeds to 1616. If the process determines, at 1612, that the offload result has been received from the remote computing device, then the process proceed to 1616. At 1616, the process determines whether the result (e.g., either the local result or the offload result) would cause the vehicle to enter into an unsafe state. If the process determines that the result would cause the vehicle to enter into the unsafe state (e.g., cause the vehicle to transition from a safe state to an unsafe state), then the process, at 1616, modifies the result (e.g., using a local neural network) to create a modified result. At 1618, the process sends the results (e.g., the offload results or the local results) or the modified results to an autonomous driving system (ADS) of the vehicle, and the process proceeds to 1602. For example, in FIG. 1, the safety monitor 144 may send the request 154 (and the datastream 150) to the remote computing device 130 to offload processing of the datastream 150. The safety monitor 144 may determine if a response from the remote computing device 130 has been received while waiting for the maximum acceptable wait time 162. The safety monitor 144 may determine if the instructions 152 from the remote computing device 130 or from the local computing device 140 are predicted by state estimators 142(E), 142(L) to cause the current state 148 to change to an unsafe state. If predicted by the state estimators 142(E), 142(L) to cause the current state 148 to change to the unsafe state, then the safety monitor 144 may modify the instructions 152 before sending the instructions to the ADS 164. If predicted by the state estimators 142(E), 142(L) to cause the current state 148 to remain in the safe state, then the instructions 152 may be sent to the ADS 164. Thus, the safety monitor 144 causes the workload (the datastream 150) to be processed either on the edge 109, by the remote computing device 130, or locally, by the local computing device 140, and sends the result (instructions 152) to the ADS 164.

The time period between the initialization of an offloading decision and the time that offloading decision has been resolved is referred to an offloading period. The offloading period is resolved either by a response from the edge (e.g., from the remote computing device) or a fail-over to performing computations locally (on-vehicle). The timeline is as follows:

[$n_0$–1] is the last time index of previous offload period

Assume:

$x^\wedge n_0 \triangleq x\, n_0\, 1 = NNp\, y\, n_0\, 1$ is computed locally in the last sample of the prior offloading period.

[$n_0$] Initial time index of new offload period.

The first sample of the new offload period inherits a locally computed $x^\wedge n0$ from the previous offloading period.

$x^\wedge n0$ is provided to C1 to correct u n0 as calculated by the previous offloading. Let this correct control action be $u^\wedge n_0$ A fix control action is applied at no: i.e. $u_{0-h} = u^\wedge n0$, with $u^\wedge n_0$ as calculated above. $x^\wedge[n_0]$ and $u_{0-h}$, are provided to C2, the runtime safety monitor, to generate $\Delta_{max}(x^\wedge[n_0], u_{0-h})$ The edge response estimator 143 generates an estimate for the edge response time, A based on all packets exchanged so far.

The offloading decision is determined as follows.

if $\Delta < \Delta_{max} x\, n_0,\, u_{0-h}$) then proceed with offload $A_{max}\, x^\wedge[n_0,\, u_{0-h}] > 1$; e.g., proceed to transmit y no to the edge. Initialize offload duration counter: $\Delta_{cnt} = 1$ Otherwise (if the offload is going to take too long), then the offload is terminated and local processing is used as a fail-safe.

Skip to Unsuccessful Offload with $A_{max}(x^\wedge[n_0],\, u_{0-h}) = 1$

[•]

[$n_0 + \Delta_{cnt}$] Offload in progress: no edge response and $\Delta_{cnt} < \Delta_{max}(x^\wedge[n_0])$ Maintain zero-order hold of u [$n0 + \Delta_{cnt}] = u_{0-h}$.

Increment $\Delta_{cnt}$: $\Delta_{cnt} \leftarrow \Delta_{cnt} + 1$.

[:]

A this point, the current offload period ends in one of two ways:

I. Successful Offload: (resume timeline from $n_0 + \Delta_{cnt}$)

[•]

[$n0 + \Delta$] Edge response received: $\Delta = \Delta cnt < \Delta max\, (x^\wedge[n0], u)$ 0-h Maintain control u [$n_0 + \Delta_{cnt}] = u_{0-h}$.

Initiate local evaluation of NNp for next time interval.

Use control action in next offloading period instead of evaluating NNc, i.e. u [$n_0 + \Delta + 1] = u$

[$n_1$]=NNc (y [$n_0$]). $n_0 + \Delta$ becomes time $n1 - 1$ for starting index of next offload period. (See $n_0 - 1$ time index)

II. Unsuccessful Offload: (resume timeline from $n_0 + \Delta_{cnt}$)

[:]

[$n0 + \Delta_{max}$] No edge response received, and safety expired:

$$\Delta_{cnt} = \Delta_{max}(x^\wedge[n_0],\, u_{0-h})$$

Maintain control u [$n_0 + \Delta_{max}\, (x^\wedge[n_0],\, u_{0-h})] = u_{0-h}$ Initiate local evaluation of NNp for next time interval.

Initiate local evaluation of NNc for next time interval.

$n_0 + \Delta_{max}\, (x^\wedge\, [no])$ becomes time $n_1 - 1$ for the starting index of the next offload period. (See $n_0 - 1$ time index)

Note two facts. First, if the runtime safety monitor 144 returns $A_{max}\, x^\wedge$, u=0, then it results in on-vehicle (local) computing device 140) evaluation of NNc and NNp. Second, an up-to-date estimate of the state 148 is available for both the controller shield 145 and the runtime safety monitor 144 before they act.

FIG. 17 is a flowchart of a process 1700 to train a machine learning algorithm, according to some embodiments. The process 1700 is performed during a training phase to train a machine learning algorithm to create an artificial intelligence (AI), such as a neural network, a reinforcement learning agent, or another type of AI.

At 1702, a machine learning algorithm (e.g., software code) may be created by one or more software designers. For example, the machine learning algorithm may be created by software designers. At 1704, the machine learning algorithm may be trained (e.g., fine-tuned) using pre-classified training data 1706. For example, the training data 1706 may have been pre-classified by humans, by an AI, or a combination of both. After the machine learning algorithm has been trained using the pre-classified training data 1706, the machine learning may be tested, at 1708, using test data 1710 to determine a performance metric of the machine learning. The performance metric may include, for example, precision, recall, Frechet Inception Distance (FID), or a more complex performance metric. For example, in the case of a classifier, the accuracy of the classification may be determined using the test data 1710. The data 1706, 1710, and 1716 may include sensor data (e.g., indicating potential obstacles in the environment around a vehicle) and associated vehicle data (e.g., speed, velocity, direction, and the like).

If the performance metric of the machine learning does not satisfy a desired measurement (e.g., 95%, 98%, 99% in the case of accuracy), at 1708, then the machine learning code may be tuned, at 1712, to achieve the desired performance measurement. For example, at 1712, the software designers may modify the machine learning software code to improve the performance of the machine learning algorithm. After the machine learning has been tuned, at 1712, the machine learning may be retrained, at 1704, using the pre-classified training data 1706. In this way, 1704, 1708, 1712 may be repeated until the performance of the machine learning is able to satisfy the desired performance metric. For example, in the case of a classifier, the classifier may be tuned to classify the test data 1710 with the desired accuracy.

After determining, at 1708, that the performance of the machine learning satisfies the desired performance metric, the process may proceed to 1714, where verification data 1716 may be used to verify the performance of the machine learning. After the performance of the machine learning is verified, at 1714, the machine learning 1702, which has been trained to provide a particular level of performance may be used as an AI, such as the neural networks (NN) 144 and 141, one or more of the modules 142, 143, 144, 145, 146, 147, 164, or other modules described herein that can be implemented using AI.

Figure 18:
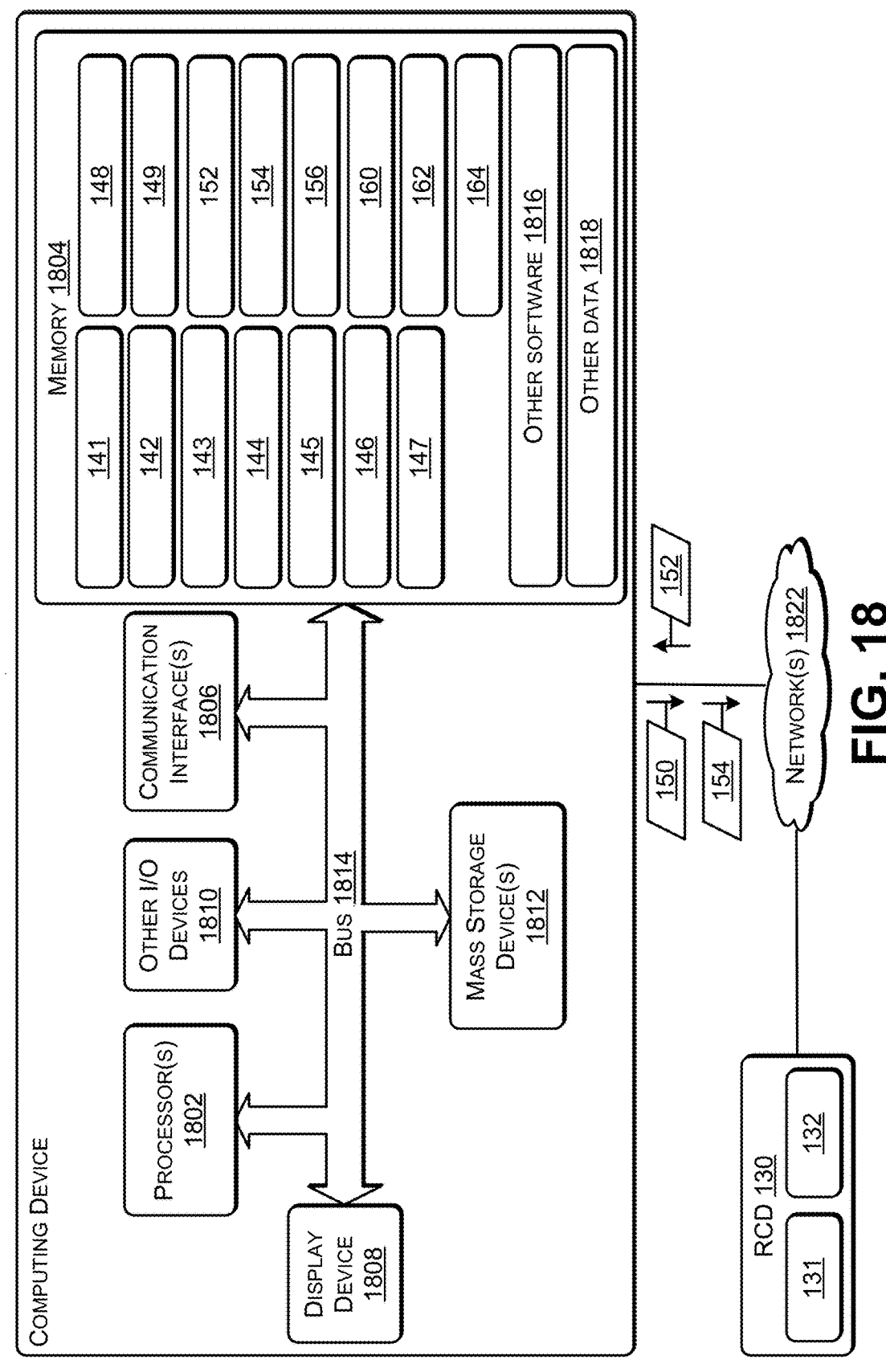
FIG. 18 illustrates an example configuration of a computing device that can be used to implement the systems and techniques described herein.

FIG. 18 illustrates an example configuration of a computing device 1800 that can be used to implement the systems and techniques described herein. For example, the computing device 1800 may be used to implement the local computing device 140, the remote computing device 130, a cloud-based facility used to provide virtual servers (such that the remote computing device 130 may be implemented as a virtual server), and other computing devices described herein.

The computing device 1800 may include one or more processors 1802 (e.g., central processing unit (CPU), graphics processing unit (GPU), or the like), a memory 1804, communication interfaces 1806, a display device 1808, other input/output (I/O) devices 1810 (e.g., keyboard, trackball, and the like), and one or more mass storage devices 1812 (e.g., disk drive, solid state disk drive, or the like), configured to communicate with each other, such as via one or more system buses 1814 or other suitable connections. While a single system bus 1814 is illustrated for ease of understanding, it should be understood that the system bus 1814 may include multiple buses, such as a memory device bus, a storage device bus (e.g., serial ATA (SATA) and the like), data buses (e.g., universal serial bus (USB) and the like), video signal buses (e.g., ThunderBolt®, digital video interface (DVI), high definition media interface (HDMI), and the like), power buses, etc.

The processors 1802 are one or more hardware devices that may include a single processing unit or a number of processing units, all of which may include single or multiple computing units or multiple cores. The processors 1802 may include a graphics processing unit (GPU) that is integrated into the CPU or the GPU may be a separate processor device from the CPU. The processors 1802 may be implemented as one or more microprocessors, microcomputers, microcontrollers, digital signal processors, central processing units, graphics processing units, state machines, logic circuitries, and/or any devices that manipulate signals based on operational instructions. Among other capabilities, the processors 1802 may be configured to fetch and execute computer-readable instructions stored in the memory 1804, mass storage devices 1812, or other computer-readable media.

Memory 1804 and mass storage devices 1812 are examples of computer storage media (e.g., memory storage devices) for storing instructions that can be executed by the processors 1802 to perform the various functions described herein. For example, memory 1804 may include both volatile memory and non-volatile memory (e.g., random access memory (RAM), read only memory (ROM), or the like) devices. Further, mass storage devices 1812 may include hard disk drives, solid-state drives, removable media, including external and removable drives, memory cards, flash memory, floppy disks, optical disks (e.g., compact disc (CD), digital versatile disc (DVD), a storage array, a network attached storage (NAS), a storage area network (SAN), or the like. Both memory 1804 and mass storage devices 1812 may be collectively referred to as memory or computer storage media herein and may be any type of non-transitory media capable of storing computer-readable, processor-executable program instructions as computer program code that can be executed by the processors 1802 as a particular machine configured for carrying out the operations and functions described in the implementations herein.

The computing device 1800 may include one or more communication interfaces 1806 for exchanging data via the network 1822. The communication interfaces 1806 can facilitate communications within a wide variety of networks and protocol types, including wired networks (e.g., Ethernet, Data Over Cable Service Interface Specification (DOCSIS), digital subscriber line (DSL), Fiber, universal serial bus (USB) etc.) and wireless networks (e.g., wireless local area network (WLAN), global system for mobile (GSM), code division multiple access (CDMA), 802.11, Bluetooth, Wireless USB, ZigBee, cellular, satellite, etc.), the Internet and the like. Communication interfaces 1806 can also provide communication with external storage, such as a storage array, network attached storage, storage area network, cloud storage, or the like.

The display device 1808 may be used for displaying content (e.g., information and images) to users. Other I/O devices 1810 may be devices that receive various inputs from a user and provide various outputs to the user, and may include a keyboard, a touchpad, a mouse, a gaming controller (e.g., joystick, steering controller, accelerator pedal, brake pedal controller, virtual reality (VR) headset, VR glove, or the like), a printer, audio input/output devices, and so forth.

The computer storage media, such as memory 1804 and mass storage devices 1812, may be used to store any of the software and data described herein as shown, as well as other software 1816 and other data 1818.

The example systems and computing devices described herein are merely examples suitable for some implementations and are not intended to suggest any limitation as to the scope of use or functionality of the environments, architectures and frameworks that can implement the processes, components and features described herein. Thus, implementations herein are operational with numerous environments or architectures, and may be implemented in general purpose and special-purpose computing systems, or other devices having processing capability. Generally, any of the functions described with reference to the figures can be implemented using software, hardware (e.g., fixed logic circuitry) or a combination of these implementations. The term "module," "mechanism" or "component" as used herein generally represents software, hardware, or a combination of software and hardware that can be configured to implement prescribed functions. For instance, in the case of a software implementation, the term "module," "mechanism" or "component" can represent program code (and/or declarative-type instructions) that performs specified tasks or operations when executed on a processing device or devices (e.g., CPUs or processors). The program code can be stored in one or more computer-readable memory devices or other computer storage devices. Thus, the processes, components and modules described herein may be implemented by a computer program product.

Furthermore, this disclosure provides various example implementations, as described and as illustrated in the drawings. However, this disclosure is not limited to the implementations described and illustrated herein, but can extend to other implementations, as would be known or as would become known to those skilled in the art. Reference in the specification to "one implementation," "this implementation," "these implementations" or "some implementations" means that a particular feature, structure, or characteristic described is included in at least one implementation, and the appearances of these phrases in various places in the specification are not necessarily all referring to the same implementation.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. A vehicle comprising:

a power source;

one or more sensors configured to generate a stream of sensor data associated with an environment in which the vehicle is located;

an autonomous driving system (ADS) to drive the vehicle autonomously; and a local computing device comprising a memory storage device to store instructions executable by one or more processors to perform operations comprising:

receiving, by a neural network, the stream of sensor data;

outputting, by the neural network, driving instructions;

routing the driving instructions to the autonomous driving system;

estimating, by a response estimator module, an edge response time between:

sending a request to a remote computing device that is communicatively coupled to the local computing device, and receiving a response to the request from the remote computing device;

determining, by a state estimator module, a current state of the vehicle;

determining, based on the current state of the vehicle, a maximum acceptable wait time for the response to the request;

performing a comparison of the maximum acceptable wait time to the edge response time;

determining, based at least in part on the maximum acceptable wait time and on the edge response time, that a first request can be safely offloaded to the remote computing device;

sending the first request from the local computing device to the remote computing device, wherein sending the first request to the remote computing device for processing results in the local computing device consuming less power from the power source;

receiving, within the maximum acceptable wait time, a first response from the remote computing device, the first response comprising first instructions determined based at least in part on a portion of the stream of sensor data;

providing the first instructions to the autonomous driving system; and based on determining that the current state of the vehicle has transitioned from a safe state to an unsafe state, the first instructions cause the autonomous driving system to:

provide an audible warning, provide a visual warning, change a direction of the vehicle, change a speed of the vehicle, or any combination thereof.

2. The vehicle of claim 1, the operations further comprising:

determining, based at least in part on the maximum acceptable wait time and on the edge response time, that a second request cannot be safely offloaded to the remote computing device;

processing the second request by the local computing device;

determining, by the local computing device and based on the second request, a second response comprising second instructions; and providing the second instructions to the autonomous driving system.

3. The vehicle of claim 1, the operations further comprising:

determining, based at least in part on the maximum acceptable wait time and on the edge response time, that a third request can be safely offloaded to the remote computing device;

sending the third request from the local computing device to the remote computing device;

failing to receive, within the maximum acceptable wait time, a third response from the remote computing device;

processing the third request by the local computing device;

determining, by the local computing device and based on the third request, the third response comprising third instructions; and providing the third instructions to the autonomous driving system.

4. The vehicle of claim 1, wherein the one or more sensors comprise:

a camera comprising an imaging sensor and a lens;

a Light Detection and Ranging (LiDAR) sensor;

a Radio Detection And Ranging (RaDAR) sensor;

an ultrasound sensor; or any combination thereof.

5. The vehicle of claim 1, wherein the remote computing device is communicatively coupled to the local computing device by one or more of:

a Cellular-vehicle-to-everything (C-V2X) connection;

a short-range communication connection;

a ZigBee connection;

a Wi-Fi connection;

a cellular-technology based connection;

a Bluetooth connection;

a near-field communication (NFC) connection;

a low-power wide-area network (LPWAN);

an ultra-wideband (UWB) connection;

an Institute of Electrical and Electronics Engineers (IEEE) 802.15 connection; or any combination thereof.

6. The vehicle of claim 1, the operations further comprising wherein the current state of the vehicle comprises either:

based on determining that the current state of the vehicle is the safe state, the first instructions cause the vehicle to remain in the safe state a safe state; or an unsafe state.

7. The vehicle of claim 1, wherein:

sending the first request to the remote computing device for processing results in the local computing device consuming less power from a power source of the vehicle the first instructions are designed to:

cause the current state of the vehicle to remain in a safe state; or transition the current state of the vehicle from an unsafe state to the safe state.

8. A local computing device of a vehicle comprising:

one or more processors; and a non-transitory memory device to store instructions executable by the one or more processors to perform operations comprising:

receiving, by a neural network, a stream of sensor data generated by one or more sensors disposed on the vehicle, the stream of sensor data associated with an environment in which the vehicle is located;

outputting, by the neural network, driving instructions;

routing the driving instructions to an autonomous driving system that is configured to autonomously drive the vehicle;

estimating, by a response estimator module, an edge response time between:

sending a request to a remote computing device that is communicatively coupled to the local computing device, and receiving a response to the request from the remote computing device;

determining, a state estimator module, a current state of the vehicle;

determining, based on the current state of the vehicle, a maximum acceptable wait time for the response to the request;

performing a comparison of the maximum acceptable wait time to the edge response time;

determining, based at least in part on the maximum acceptable wait time and on the edge response time, that a first request can be safely offloaded to the remote computing device;

sending the first request from the local computing device to the remote computing device, wherein sending the first request to the remote computing device for processing results in the local computing device consuming less power from a power source of the vehicle;

receiving, within the maximum acceptable wait time, a first response from the remote computing device, the first response comprising first instructions determined based at least in part on a portion of the stream of sensor data;

providing the first instructions to an autonomous driving system; and based on determining that the current state of the vehicle has transitioned from a safe state to an unsafe state, the first instructions cause the autonomous driving system to:

provide an audible warning, provide a visual warning, change a direction of the vehicle, change a speed of the vehicle, or any combination thereof.

9. The local computing device of claim 8, the operations further comprising:

determining, based at least in part on the maximum acceptable wait time and on the edge response time, that a second request can be safely offloaded to the remote computing device;

sending the second request from the local computing device to the remote computing device;

receiving, within the maximum acceptable wait time, a second response from the remote computing device, the second response comprising second instructions;

determining that the second instructions would cause the current state of the vehicle to transition to the unsafe state;

determining, by the local computing device, an alternate set of instructions; and providing the alternate set of instructions, instead of the second instructions, to the autonomous driving system controller.

10. The local computing device of claim 8, the operations further comprising:

determining, based at least in part on the maximum acceptable wait time and on the edge response time, that a third request can be safely offloaded to the remote computing device;

sending the third request from the local computing device to the remote computing device;

failing to receive, within the maximum acceptable wait time, a third response from the remote computing device;

processing the third request by the local computing device;

determining, by the local computing device and based on the third request, the third response comprising third instructions; and providing the third instructions to the autonomous driving system.

11. The local computing device of claim 8, the operations further comprising:

determining, based at least in part on the maximum acceptable wait time and on the edge response time, that a third request can be safely offloaded to the remote computing device;

sending the third request from the local computing device to the remote computing device;

failing to receive, within the maximum acceptable wait time, a third response from the remote computing device;

processing the third request by the local computing device;

determining, by the local computing device and based on the third request, the third response comprising third instructions;

determining that the third instructions would cause the current state of the vehicle to transition to the unsafe state;

determining, by the local computing device, an alternate set of instructions; and providing the alternate set of instructions, instead of the third instructions, to the autonomous driving system controller.

12. The local computing device of claim 8, wherein the remote computing device is communicatively coupled to the local computing device by one or more of:

a Cellular-vehicle-to-everything (C-V2X) connection;

a short-range communication connection;

a ZigBee connection;

a Wi-Fi connection;

a cellular-technology based connection;

a Bluetooth connection;

a near-field communication (NFC) connection;

a low-power wide-area network (LPWAN);

an ultra-wideband (UWB) connection;

an Institute of Electrical and Electronics Engineers (IEEE) 802.15 connection; or any combination thereof.

13. The local computing device of claim 8, the operations further comprising wherein:

based on determining that the current state of the vehicle is the safe state, the first instructions cause the vehicle to remain in the safe state the current state of the vehicle comprises either:

a safe state; or an unsafe state; and the first instructions are determined, by the remote computing device, to cause:

the current state of the vehicle to remain in the safe state; or the current state of the vehicle to transition from the unsafe state to the safe state.

14. A non-transitory computer-readable memory device of a local computing device is configured to store instructions executable by one or more processors to perform operations comprising:

receiving, by a neural network, a stream of sensor data generated by one or more sensors disposed on a vehicle in which the local computing device is located, the stream of sensor data associated with an environment in which a vehicle is located;

outputting, by the neural network, driving instructions;

routing the driving instructions to an autonomous driving system that is configured to autonomously drive the vehicle;

estimating, by a response estimator module, an edge response time between:

sending a request to a remote computing device that is communicatively coupled to the local computing device, and receiving a response to the request from the remote computing device;

determining, a state estimator module, a current state of the vehicle;

determining, based on the current state of the vehicle, a maximum acceptable wait time for the response to the request;

performing a comparison of the maximum acceptable wait time to the edge response time;

determining, based at least in part on the maximum acceptable wait time and on the edge response time, that a first request can be safely offloaded to the remote computing device;

sending the first request from the local computing device to the remote computing device, wherein sending the first request to the remote computing device for processing results in the local computing device consuming less power from a power source of the vehicle;

receiving, within the maximum acceptable wait time, a first response from the remote computing device, the first response comprising first instructions determined based at least in part on a portion of the stream of sensor data;

providing the first instructions to an autonomous driving system; and based on determining that the current state of the vehicle has transitioned from a safe state to an unsafe state, the first instructions cause the autonomous driving system to:

provide an audible warning, provide a visual warning, change a direction of the vehicle, change a speed of the vehicle, or any combination thereof.

15. The non-transitory computer-readable memory device of claim 14, further comprising:

determining, based at least in part on the maximum acceptable wait time and on the edge response time, that a second request can be safely offloaded to the remote computing device;

sending the second request from the local computing device to the remote computing device;

receiving, within the maximum acceptable wait time, a second response from the remote computing device, the second response comprising second instructions;

determining that the second instructions would cause the current state of the vehicle to transition to the unsafe state;

determining, by the local computing device, an alternate set of instructions; and providing the alternate set of instructions, instead of the second instructions, to an autonomous driving system controller.

16. The non-transitory computer-readable memory device of claim 14, further comprising:

determining, based at least in part on the maximum acceptable wait time and on the edge response time, that a third request can be safely offloaded to the remote computing device;

sending the third request from the local computing device to the remote computing device;

failing to receive, within the maximum acceptable wait time, a third response from the remote computing device;

processing the third request by the local computing device;

determining, by the local computing device and based on the third request, the third response comprising third instructions; and providing the third instructions to the autonomous driving system.

17. The non-transitory computer-readable memory device of claim 14, wherein the one or more sensors comprise:

a camera comprising an imaging sensor and a lens;

a Light Detection and Ranging (LiDAR) sensor;

a Radio Detection And Ranging (RaDAR) sensor;

an ultrasound sensor; or any combination thereof.

18. The non-transitory computer-readable memory device of claim 14, wherein the remote computing device is communicatively coupled to the local computing device by one or more of:

a Cellular-vehicle-to-everything (C-V2X) connection;

a short-range communication connection;

a ZigBee connection;

a Wi-Fi connection;

a cellular-technology based connection;

a Bluetooth connection;

a near-field communication (NFC) connection;

a low-power wide-area network (LPWAN);

an ultra-wideband (UWB) connection;

an Institute of Electrical and Electronics Engineers (IEEE) 802.15 connection; or any combination thereof.

19. The non-transitory computer-readable memory device of claim 14, further comprising wherein the current state of the vehicle comprises either:

based on determining that the current state of the vehicle is the safe state, the first instructions cause the vehicle to remain in the safe state a safe state; or an unsafe state.

20. The non-transitory computer-readable memory device of claim 14, wherein the first instructions are designed to cause:

sending the first request to the remote computing device for processing results in the local computing device consuming less power from a power source of the vehicle the current state of the vehicle to remain in a safe state; or the current state of the vehicle to transition from an unsafe state to the safe state.

* * * * *